(12) United States Patent
Blank et al.

(10) Patent No.: US 8,500,895 B2
(45) Date of Patent: Aug. 6, 2013

(54) METHODS OF MARKING AND RELATED STRUCTURES AND COMPOSITIONS

(75) Inventors: David H. Blank, Lebanon, NH (US); Benjamin J. Brown, Keene, NH (US); Michael P. Secord, West Chesterfield, NH (US); James W. Foley, Andover, MA (US)

(73) Assignee: Marken-Imaje Corporation, Keene, NH (US)

( * ) Notice: Subject to any disclaimer, the term of this patent is extended or adjusted under 35 U.S.C. 154(b) by 1073 days.

(21) Appl. No.: 11/789,263

(22) Filed: Apr. 24, 2007

(65) Prior Publication Data

US 2007/0269740 A1 Nov. 22, 2007

Related U.S. Application Data

(63) Continuation-in-part of application No. 11/438,469, filed on May 22, 2006, now abandoned, and a continuation-in-part of application No. 11/493,139, filed on Jul. 26, 2006, now abandoned.

(51) Int. Cl.
*C09D 11/02* (2006.01)

(52) U.S. Cl.
USPC ..................................... 106/31.32; 106/31.64

(58) Field of Classification Search
USPC .......................................... 106/31.32, 31.64
See application file for complete search history.

(56) References Cited

U.S. PATENT DOCUMENTS

| | | |
|---|---|---|
| 3,539,375 A | 11/1970 | Baum |
| 3,674,535 A | 7/1972 | Blose et al. |
| 4,151,748 A | 5/1979 | Baum |
| 4,181,771 A | 1/1980 | Hanson et al. |
| 4,246,318 A | 1/1981 | Baum |
| 4,470,057 A | 9/1984 | Glanz |
| 4,527,178 A * | 7/1985 | Usui et al. ............... 503/207 |
| 5,008,238 A * | 4/1991 | Gotoh et al. ............ 503/217 |
| 5,084,593 A * | 1/1992 | Gotoh et al. ............ 558/405 |
| 5,102,856 A * | 4/1992 | Doll et al. ............... 503/209 |
| 5,137,797 A * | 8/1992 | Nakamura ............... 430/211 |
| 5,413,629 A * | 5/1995 | Yasui et al. ............. 106/31.15 |
| 5,451,478 A | 9/1995 | Boggs et al. |
| 5,703,006 A * | 12/1997 | Mori et al. ............... 503/207 |
| 5,804,671 A | 9/1998 | Dones et al. |
| 5,889,076 A | 3/1999 | Dones et al. |
| 5,948,596 A | 9/1999 | Zhong et al. |
| 6,093,239 A | 7/2000 | Baker et al. |
| 6,093,678 A * | 7/2000 | Hamada et al. ......... 503/217 |
| 6,239,189 B1 | 5/2001 | Narayan et al. |
| 6,261,348 B1 * | 7/2001 | Kwan et al. ............. 106/31.14 |
| 6,316,517 B1 | 11/2001 | Dones et al. |
| 6,333,005 B1 * | 12/2001 | Nguyen .................. 422/13 |

(Continued)

FOREIGN PATENT DOCUMENTS

WO WO 2005068207 A1 * 7/2005

OTHER PUBLICATIONS www.nanominerals.com, hydrous clay definition.*
www.wikipedia.com, kaolinite definition.*

(Continued)

*Primary Examiner* — Kaj K Olsen
*Assistant Examiner* — Veronica F Faison
(74) *Attorney, Agent, or Firm* — Fish & Richardson P.C.

(57) ABSTRACT

Methods are disclosed that include directing electromagnetic radiation and/or heat to a structure, the structure including a substrate, a first layer, and a marking composition between the substrate and the first layer. At least a portion of the electromagnetic radiation and/or heat is transmitted through the first layer and the structure is marked.

49 Claims, 10 Drawing Sheets

(56) References Cited

U.S. PATENT DOCUMENTS

| | | | |
|---|---|---|---|
| 2004/0147399 A1* | 7/2004 | Gore | 503/221 |
| 2005/0053870 A1* | 3/2005 | Willard et al. | 430/332 |
| 2005/0164116 A1* | 7/2005 | Wang et al. | 430/138 |
| 2006/0023615 A1 | 2/2006 | Ootera | |
| 2007/0099130 A1* | 5/2007 | Takahashi et al. | 430/435 |
| 2007/0270310 A1 | 11/2007 | Blank et al. | |

OTHER PUBLICATIONS

International Search Report, Application No. PCT/US07/69354, dated Feb. 25, 2008.

Gensler et al., "Hydrolysis and Autoxidation of N-Benzoylleucomethylene Blue", Journal of Organic Chemistry, vol. 31, No. 7, pp. 2324-2330, 1966.

U.S. Appl. No. 11/493,139, filed Jul. 26, 2006, Blank.

Berins, M. L. (ed.), Plastics Engineering Handbook of the Society of the Plastics Industry, 5th ed. New York: Van Nostrand Reinhold, 1991, ISBN 0442317999, pp. 789 and 791.

Grim, Ralph E. "Clay Mineralogy", 2nd Edition, New York: McGraw Hill, pp. 450-455 (1968).

* cited by examiner

100% Power
Dwell = 250 μsec

75% Power
Dwell = 250 μsec

75% Power
Dwell = 250 μsec
30X magnification

50% Power
Dwell = 250 μsec

Dwell = 250 μsec
Power = 100%
Mounted on dull side

Dwell = 250 μsec
Power = 100%
Mounted on shiny side

Dwell = 250 μsec
Power = 75%
Mounted on shiny side

Dwell = 250 μsec
Power = 50%
Mounted on shiny side

Power = 15%
Dwell = 200 μsec

Power = 15%
Dwell = 200 μsec

Power = 30%
Dwell = 200 μsec

Power = 30%
Dwell = 200 μsec

METHODS OF MARKING AND RELATED STRUCTURES AND COMPOSITIONS

CROSS REFERENCE TO RELATED APPLICATIONS

This application is a continuation-in-part, and claims the benefit of priority from U.S. patent application Ser. Nos. 11/438,469, filed May 22, 2006 now abandoned and 11/493,139, filed Jul. 26, 2006 now abandoned. The entire disclosure of each is hereby incorporated by reference herein in its entirety.

TECHNICAL FIELD

The invention relates to methods of marking, and related structures and compositions.

BACKGROUND

Many food products are packaged and sold in flexible packaging to protect the products, to prolong the products' shelf life, and/or for the consumer's convenience. For example, products such as salty snacks (e.g., potato chips and pretzels) and baked goods are commonly packaged in flexible bags. Other food products such as confectionaries (e.g., candies and candy bars) are also commonly packaged in flexible bags or wrapped in flexible packaging. The packaging can include one layer (e.g., paper) or multiple layers where each layer may provide a different function (e.g., to prolong shelf life or to provide a desire aesthetic).

The packaging typically contains informative graphics and other marks. For example, the packaging may contain a decorative design or a distinctive feature, such as a company's trademark or logo. The packaging may also contain information such as a list of ingredients, a lot number from which the product was produced, and an expiration date.

SUMMARY

In one aspect, the invention relates to methods of marking, for example, to form a desired graphic or another mark on an article, such as flexible packaging. The methods can include directing electromagnetic radiation (e.g., from a laser) to an article having a marking composition. The marking composition is capable of interacting with the electromagnetic radiation to form the graphic or the mark. The invention also relates to marking compositions, and articles including the marking compositions and their uses.

In another aspect, the invention features a method, including directing electromagnetic radiation to a structure, the structure having a substrate, a first layer, and a marking composition between the substrate and the first layer. At least a portion of the electromagnetic radiation is transmitted through the first layer, and the structure is marked.

Aspects and/or embodiments may include one or more of the following features. The marking composition prior to directing electromagnetic radiation to the structure exhibits a first color (e.g., white or clear), and after directing electromagnetic radiation to the structure, the mark exhibits a second color different from the first color. The change from the first color to the second color can be a permanent change. The first color may be white or clear and the second color may be blue. The electromagnetic radiation has a wavelength of from approximately 200 nanometers to approximately 15,000 nanometers. The electromagnetic radiation has a wavelength of from approximately 400 nanometers to approximately 1,200 nanometers. The electromagnetic radiation is delivered from a laser. The electromagnetic radiation has an energy density from approximately 0.1 J/cm$^2$ to approximately 7 J/cm$^2$, e.g., 0.4 J/cm$^2$ to approximately 1 J/cm$^2$. The substrate includes polyethylene, polypropylene, poly(vinylidene chloride), or other barrier polymers. The marking composition includes a dye and a color developer. The dye is unencapsulated. The dye includes a leuco dye. The color developer includes an acid. The marking composition includes from about 30 wt % to about 50 wt % of the dye and the color developer. The marking composition further includes an absorber capable of producing thermal energy upon interacting with the electromagnetic radiation. The marking composition includes from about 1 wt % to about 20 wt % of the absorber, or less, e.g., from about 0.125 wt % to about 1 wt % for near IR absorbers. The amount of absorber in a particular formulation depends upon type of absorber utilized. The absorber includes a hydrous aluminosilicate. The marking composition further includes a solvent. The solvent includes water or an aqueous solution. The marking composition further includes a film-forming material. The film-forming material includes an acrylic resin or a urethane resin. The first layer includes a polymer. The first layer has a thickness of from approximately 0.1 mil to approximately 1.5 mil. The structure further includes an adhesive between the substrate and the first layer. The mark includes a number, a letter, a word, a symbol, or a bar code. The method includes enclosing a consumer product with the structure. In some implementations, the solvent includes organic solvents, such as ethanol, ethyl acetate, or other common flexographic ink solvents, or solvent blends.

In another aspect, the invention features a method, including directing electromagnetic radiation to a marking composition on a substrate to form a mark, the marking composition comprising a dye and a color developer.

Aspects and/or embodiments may include one or more of the following features. The dye is unencapsulated. The dye includes a leuco dye. The color developer includes an acid. The marking composition includes from about 30 wt % to about 50 wt % of the dye and the color developer. The marking composition is substantially free of an absorber capable of producing thermal energy upon interacting with the electromagnetic radiation. The marking composition can further includes an absorber capable of producing thermal energy upon interacting with the electromagnetic radiation. The marking composition includes from about 1 wt % to about 20 wt % of the absorber, or less. The absorber includes a hydrous aluminosilicate. The electromagnetic radiation has a wavelength of from approximately 200 nanometers to approximately 15,000 nanometers. The electromagnetic radiation has a wavelength of from approximately 400 nanometers to approximately 1,200 nanometers. The electromagnetic radiation is delivered from a laser. The electromagnetic radiation has an energy density from approximately 0.1 J/cm$^2$ to approximately 7 J/cm$^2$, e.g., approximately 0.4 J/cm$^2$ to approximately 1 J/cm$^2$. The substrate includes polyethylene, polypropylene, poly(vinylidene chloride), or other barrier polymer. The marking composition further includes a solvent. The solvent includes water or an aqueous solution. The marking composition further includes a film-forming material. The film-forming material includes an acrylic resin or a urethane resin. The mark includes a number, a letter, a word, a symbol, or a bar code. The method further includes enclosing a consumer product with the substrate and the marking composition. The electromagnetic radiation passes through a layer of material carried by the substrate before interacting with the marking composition.

In another aspect, the invention features a method, including directing electromagnetic radiation to a marking composition on a substrate to form a mark, the marking composition comprising a dye and/or an absorber capable of producing thermal energy upon interacting with the electromagnetic radiation.

Aspects and/or embodiments may include one or more of the following features. The dye is unencapsulated. The dye includes a leuco dye. The marking composition includes from about 1 wt % to about 20 wt % of the absorber, or less, e.g., 0.125 wt % to about 1 wt % for a near IR absorber. The absorber includes a hydrous aluminosilicate. The electromagnetic radiation has a wavelength of from approximately 200 nanometers to approximately 15,000 nanometers. The electromagnetic radiation has a wavelength of from approximately 400 nanometers to approximately 1,200 nanometers. The electromagnetic radiation is delivered from a laser. The electromagnetic radiation has an energy density from approximately 0.1 $J/cm^2$ to approximately 7 $J/cm^2$, e.g., approximately 0.4 $J/cm^2$ to approximately 1 $J/cm^2$. The substrate includes polyethylene, polypropylene, poly(vinylidene chloride), or other barrier polymers. The marking composition further includes a color developer. The color developer includes an acid. The marking composition includes from about 30 wt % to about 50 wt % of the dye and the color developer. The marking composition further includes a solvent. The solvent includes water or an aqueous solution. The marking composition further includes a film-forming material. The film-forming material includes an acrylic resin or a urethane resin. The mark includes a number, a letter, a word, a symbol, or a bar code. The method further includes enclosing a consumer product with the substrate and the marking composition. The electromagnetic radiation passes through a layer of material carried by the substrate before interacting with the marking composition. The marking composition is directly marked, e.g., is not protected by a barrier layer. Thermal energy can cause the color change. For example, the thermal energy can be provided by a laser, a thermal printhead, a hot gas jet, such as a hot air jet, or a hot filament immediately adjacent the marking composition.

In another aspect, the invention features an article, including a substrate; a first layer; and a marking composition between the substrate and the first layer, the marking composition including a dye and a color developer, the marking composition being capable of interacting with incident electromagnetic radiation to form a mark.

Aspects and/or embodiments may include one or more of the following features. The marking composition prior to interacting with the electromagnetic radiation exhibits a first color, and after interacting with the radiation, the mark exhibits a second color different from the first color. The dye is unencapsulated. The dye includes a leuco dye. The color developer includes an acid. The marking composition includes from about 8 wt % to about 60 wt %, e.g., 30 wt % to about 50 wt % of the dye and the color developer. The marking composition further includes an absorber capable of producing thermal energy upon interacting with the electromagnetic radiation. The marking composition includes from about 1 wt % to about 20 wt % of the absorber, or less, e.g., 0.125 wt % to about 1 wt % for a near IR absorber. The absorber includes a hydrous aluminosilicate. The marking composition further includes a solvent. The solvent includes water or an aqueous solution. The solvent includes an organic solvent, such as those common in flexographic ink. The marking composition further includes a film-forming material. The film-forming material includes an acrylic resin or a urethane resin. The first layer includes a polymer. The first layer has a thickness of from approximately 0.1 mil to approximately 1.5 mil. The structure further includes an adhesive between the substrate and the first layer. The electromagnetic radiation has a wavelength of from approximately 200 nanometers to approximately 15,000 nanometers. The electromagnetic radiation is monochromatic laser energy. The electromagnetic radiation has an energy density from approximately 0.1 $J/cm^2$ to approximately 7 $J/cm^2$, e.g., approximately 0.4 $J/cm^2$ to approximately 1 $J/cm^2$. The substrate includes polyethylene, polypropylene, or poly(vinylidene chloride).

In another aspect, the invention features an article, including a substrate; and a marking composition on the substrate, the marking composition including an absorber capable of producing thermal energy upon interacting with electromagnetic radiation, a dye, and a color developer, the marking composition being capable of interacting with the electromagnetic radiation to form a mark.

Aspects and/or embodiments may include one or more of the following features. The dye is unencapsulated. The dye includes a leuco dye. The color developer includes an acid. The marking composition includes from about 8 wt % to about 60 wt %, e.g., from about 30 wt % to about 50 wt % of the dye and the color developer. The marking composition includes from about 1 wt % to about 20 wt % of the absorber, or less, e.g., 0.125 wt % to about 1 wt % for a near IR absorber. The absorber includes a hydrous aluminosilicate. The marking composition further includes a solvent. The solvent includes water or an aqueous solution. The marking composition further includes a film-forming material. The film-forming material includes an acrylic resin or a urethane resin. The electromagnetic radiation has a wavelength of from approximately 200 nanometers to approximately 15,000 nanometers. The electromagnetic radiation is monochromatic laser energy. The electromagnetic radiation has an energy density from approximately 0.1 $J/cm^2$ to approximately 7 $J/cm^2$, e.g., 0.4 $J/cm^2$ to approximately 1 $J/cm^2$. The substrate includes polyethylene, polypropylene, poly(vinylidene chloride), or other barrier polymers.

In another aspect, the invention features a marking composition, including an absorber capable of producing thermal energy upon interacting with electromagnetic radiation; and a thermally activatable coloring composition, wherein the marking composition is capable of interacting with the electromagnetic radiation to form a mark.

Aspects and/or embodiments may include one or more of the following features. The absorber has a maximum absorption wavelength from about 200 nm to about 15,000 nm. The absorber has a maximum absorption wavelength from about 8,000 nm to about 12,000 nm. The absorber includes a hydrous aluminosilicate. The absorber comprises a particle having an average dimension from about 0.1 micron to about 40 microns. The absorber is substantially transparent. The absorber is of a white color. The marking composition includes from about 1 wt % to about 20 wt % of the absorber, or less in the case of a near IR absorber. The thermally activatable coloring composition includes a dye and a color developer. The dye is unencapsulated. The dye includes a leuco dye. The color developer includes an acid. The marking composition further includes a solvent. The solvent includes water or an aqueous solution. The solvent includes one or more organic solvents. The marking composition further includes a film-forming material. The film-forming material includes an acrylic resin or a urethane resin.

In another aspect, the invention features a method of unmasking a masked colorant. The method includes exposing an object coated with the masked colorant to radiation having a power less than 10 W and a wavelength of greater than about 700 nm or 800 nm, e.g., 700 nm to about 10.6 microns, thereby unmasking the masked colorant to produce a change in color of the object coated with the masked colorant.

Aspects and/or embodiments may include one or more of the following features. The radiation has a power of less than about 5 W, e.g., a power of about 1 W. The radiation has an energy less than about 7 J/cm$^2$, for example, about 1 j/cm$^2$. The wavelength of the radiation is greater than about 700 nm or 900 nm or 1000 nm or 1100 nm. For example, the wavelength of radiation can be between about 1050 nm and about 1075 nm. The masked colorant is substantially free of inorganic salts. The masked colorant is an organic colorant. The masked colorant is a protected colorant and the unmasking comprises the deprotection of a protected colorant, e.g., a xanthene or an indigo precursor, such as an indigo compound in leuco form, e.g., a protected leuco form including a carbonate protecting group, an ethyl carbonate, a t-butyl carbonate, or a silyl protecting group (e.g., a TMS or TIPS protecting group). The masked colorant is a methylene blue precursor, such as N-benzyolleucomethlene blue. The masked colorant has been layered with an inorganic salt, such as a titanium salt TiO$_2$ or other inorganic salts such as CaCO$_3$ or ZnO. The object includes multiple layers and the coating of masked colorant is positioned between two layers, e.g., the coating of masked colorant is not directly open to air. The masked colorant is a component of a composition. The composition is substantially free of organic solvent. The composition is a hot melt ink. The composition is a UV curable ink. The composition is a water based ink. The composition is a flexographic ink. The unmasked colorant produces an indicia on the object, e.g., a date of packaging, a date of expiration, or a lot number. The object is a package for a foodstuff. The radiation is laser radiation.

In another aspect, the invention features a multilayered object, the object including a first layer and a second layer; and a masked colorant between the first layer and second layer.

Aspects and/or embodiments may include one or more of the following features. The first layer is a laminate layer. The second layer is a base layer. The masked colorant is substantially free of inorganic salts. The masked colorant is an organic colorant, such as indigo blue or methylene blue.

In another aspect, the invention features a method of unmasking a masked colorant, the method including exposing a masked colorant to radiation of a wavelength of greater than about 400 nm, thereby unmasking the masked colorant.

Aspects and/or embodiments can include one or more of the following features. The radiation has a wavelength of greater than about 700 nm or 800 nm. the wavelength of the radiation is greater than about 10000 nm, e.g., 10,600 nm. The radiation is delivered at a power of less than about 10 Watts. The radiation has a power of less than about 5 W and more than about 1 W. The radiation has an energy less than about 7 J/cm$^2$. The masked colorant is a protected colorant and the unmasking includes the deprotection of a protected colorant. The masked colorant is a xanthene precursor in a protected leuco form. The protected leuco form includes a carbonate protecting group. The masked colorant is a methylene blue precursor. The masked colorant has been incorporated into an ink. The unmasked colorant produces an indicia on an substrate.

In another aspect, the invention features a method of marking a substrate, the method including exposing a substrate coated with a composition that includes a masked colorant to radiation of a wavelength of greater than about 400 nm, thereby unmasking the masked colorant to produce a mark on the coated substrate.

Aspects and/or embodiments can include one or more of the following features. The radiation has a wavelength of greater than about 700 nm or 800 nm. The radiation is delivered at a power of less than about 10 Watts. The radiation has a power of less than about 5 W and more than about 1 W. The radiation has an energy less than about 7 J/cm$^2$. The wavelength of the radiation is greater than about 9000 nm or 10000 nm. The wavelength of radiation is between about 10500 nm and about 10750 nm. The masked colorant is a is protected colorant and the unmasking includes the deprotection of a protected colorant. The masked colorant is an xanthene precursor. The indigo precursor is an indigo compound in the leuco form. The leuco form is a protected leuco form. The protected leuco form comprise a carbonate protecting group. The carbonate protecting group is an ethyl carbonate or a t-butyl carbonate. The masked colorant is a methylene blue precursor. The mark is produced by at least one change in color that occurs when the colorant is unmasked. The masked colorant has been incorporated into an ink. The ink includes at least one additional colorant. The additional colorant is TiO$_2$. The substrate includes a first layer and a second layer and the coating is positioned between the two layers. The coating of masked colorant is covered by at least one additional layer. The colorant is a component of a composition substantially free of organic solvent. The composition is a flexographic ink.

In another aspect, the invention features an article that includes a multilayered substrate that includes a first layer, a second layer and a masked colorant between the first layer and second layer.

Aspects and/or embodiments may have one or more of the following features. The masked colorant is a protected colorant and the unmasking comprises the deprotection of a protected colorant. The masked colorant is an indigo precursor in a protected leuco form. The protected leuco form includes a carbonate protecting group. The masked colorant is a methylene blue precursor. The masked colorant has been incorporated into an ink. The method further includes an unmasked colorant and the unmasked colorant produces an indicia on an substrate after exposure to heat and/or electromagnetic radiation. The unmasked colorant produces an indicia on an substrate.

In another aspect, the invention features a composition that includes a masked colorant, an absorber and a binder.

Aspects and/or embodiments may include one or more of the following features. The composition exhibits a first color at room temperature and nominal atmospheric pressure, and when the composition is exposed to a temperature above room temperature and/or when exposed to electromagnetic radiation, the composition changes to a second color different from the first color in areas exposed to the heat and/or radiation. The composition undergoes color change when exposed to radiation of wavelength greater than about 400 nm. The masked colorant is an indigo precursor in a protected leuco form. The protected leuco form includes a carbonate protecting group. The masked colorant is a methylene blue precursor. The color change is caused by the unmasking of the masked colorant.

In another aspect, the invention features articles that include a substrate and an activatable marking composition (e.g., a thermally activatable and/or a radiation activatable composition) disposed on and/or in the substrate. The marking composition includes a leuco dye and a clay. The marking composition exhibits a first color at room temperature (e.g., at or around 25° C.) and nominal atmospheric pressure (e.g., at or around 1 ATM). When the marking composition is contacted by heat and/or radiation, the marking composition exhibits a second color different from the first color in areas of contact. Contact can be direct or indirect contact. The color change can be a permanent color change. The leuco dye can include N-benzoylleucomethylene blue. The clay may include an acidic and/or a basic clay. The heat and/or radiation is delivered from a laser.

In another aspect, the invention features a package that includes a substrate and an activatable marking composition disposed on and/or in the substrate or a portion of the substrate. The marking composition exhibits a first color at room temperature and nominal atmospheric pressure, and when the marking composition is contacted by heat and/or radiation, the marking composition exhibits a second color different from the first color in areas of contact. Prior to the contacting of the marking composition by heat and/or radiation, the package has a first oxygen transmission rate, and after contacting the marking composition with the heat and/or radiation, the package has a second oxygen transmission rate that is not more than about 25 percent higher than the first oxygen transmission rate.

In some embodiments, the second oxygen transmission rate is not more than about 10 percent higher than the first oxygen transmission rate, e.g., not more than 5 percent, 2.5 percent or 1 percent. In some embodiments, the second oxygen transmission rate is substantially the same as the first oxygen transmission rate.

In some embodiments, the package also has a first carbon dioxide transmission rate. After contacting the marking composition with the heat and/or radiation, the package has a second carbon dioxide transmission rate that is not more than 25 percent higher than the first carbon dioxide transmission rate.

In some embodiments, the package also has a first water vapor transmission rate. After contacting the marking composition with the heat and/or radiation, the package has a second water transmission rate that is not more than 25 percent higher than the first water transmission rate.

In some implementations, the marking composition includes a leuco dye and a clay. For example, the leuco dye can be N-benzoylleucomethylene blue.

In certain implementations, the heat and/or radiation is delivered from a laser.

In another aspect, the invention features methods of forming a package or a film. The methods include selecting a first pre-form material having an activatable marking composition disposed on and/or therein; and introducing the first pre-form material along with a molten resin into a nip defined between a first roll and a second roll. The molten resin is introduced at a first temperature above an activation temperature of the activatable marking composition. After passing through the nip, the marking composition is in an un-activated state.

In some implementations, the methods further include introducing a second pre-form material along with the first pre-form material and the resin.

For example, the first pre-form material can include bi-axially oriented polypropylene and the second pre-form material can include metallized bi-axially oriented polypropylene.

In some implementations, the first roll is a chill roll having a surface temperature lower than that of the molten resin.

In certain implementations, the second roll includes a polymeric exterior surface that together with the second roll defines the nip.

Aspects and/or embodiments can include one or more of the following advantages.

In some embodiments, the article to be marked includes multiple layers (e.g., multiple laminated layers) and a marking composition between at least two of the layers. The lamination can occur using a resin that is at a temperature that is above a thermal transition temperature of the marking composition without substantially changing the color of the marking composition. The article can be marked by passing electromagnetic radiation (e.g., monochromatic laser energy) through at least one of the layers, and interacting the radiation with the marking composition to form a mark. As a result, the formed mark is not on an exposed surface, which can enhance the resistance of the mark to changes or other possible adulterations (e.g., due to chemical contact, abrasion, or other physical contact).

Also, because marking with electromagnetic radiation does not require physically contacting the marking composition, contamination to the mark is reduced.

Electromagnetic radiation having low energies can be used to form a mark, and as a result, the mark can be formed without negatively affecting one or more layers. For example, low laser energy can pass through one or more layers of material without substantially damaging (e.g., perforating, producing bubbles in, or otherwise compromising) the layer(s). The low laser energy can interact with the marking composition to form a mark without substantially damaging one or more layers (e.g., a substrate) underlying the marking composition. For example, a rate of gas or vapor transmission, e.g., carbon dioxide, oxygen or water, in a marked package or film can be substantially the same as an unmarked package or film.

In some embodiments, a mark is generated in a short amount of time. For example, a mark can be generated in less than about 250 microseconds (e.g., less than about 50 microseconds) without damaging a layer of material, such as a bi-axially oriented polypropylene film of 1.0 mil thickness. Damage can be determined by visually inspecting the marked material under a microscope. For example, an Olympus SZX12 microscope having bottom lighting, a DPFL APO 1.2× PF objective lens, and a Dolan-Jenner MI-150 illuminator for top lighting can be used. In some embodiments, visualization can be enhanced by using polarized light with an SPX-PO filter under the marked material and a rotatable SZX-AN filter attached to the objective lens. Damaged material can appear, for example, as one or more perforations and/or bubbling.

Marking with electromagnetic radiation (e.g., from a laser) can be reliable and cost effective. For example, because no physical contact of components is needed to form a mark, maintenance and/or repair (e.g., of moving components) can be reduced, thereby reducing the down time of the marking system. Marking with electromagnetic radiation can also provide a digital solution to marking (e.g., printing), and/or a marking approach that can be conveniently retrofitted into existing manufacturing systems.

The marking composition is also versatile. For example, the marking composition can be applied to a number of structures, such as on an exterior surface of a structure, or between layers of a multilayer (e.g., laminated) structure. In some embodiments, the energy required to create a mark is not significantly changed when the marking composition is between layers of a multilayer structure. In some embodiments, the marking composition does not thermally degrade (e.g., show premature color development) when subjected to layering techniques used in the packaging industry (e.g., in a lamination process where temperatures greater than about 550° F. can be reached). The marking composition can be marked without negatively affecting (e.g., perforating) the structure carrying the composition, such as certain standard packaging films (e.g., bi-axially oriented polypropylene films of 1.0 mil thickness).

The marking composition may include a color agent (e.g., a dye) that is a part of the laminating chemistry, e.g., is compounded into a laminating resin, e.g., a polymeric resin.

A marking composition can be included in a composition to provide a material that has ;a solids content of about hundred percent (e.g., without solvent). For example, the marking composition can be incorporated in a matrix that is UV curable, for example, by mixing it with epoxy or acrylate monomers. In some embodiments, one or more dyes and one or more absorbers are mixed with one or more UV curable monomers in the absence of solvent. The mixture can be substantially of a color developer. On exposure to UV radiation, the mixture cures, and the marking composition is formed on an article which can be marked by the methods described herein.

All publications, patent applications, patents, and other references mentioned herein are incorporated by reference herein in their entirety for all that they contain.

Other aspects, features and advantages will be apparent from the description of the following embodiments and from the claims.

DETAILED DESCRIPTION

Figure 1A:
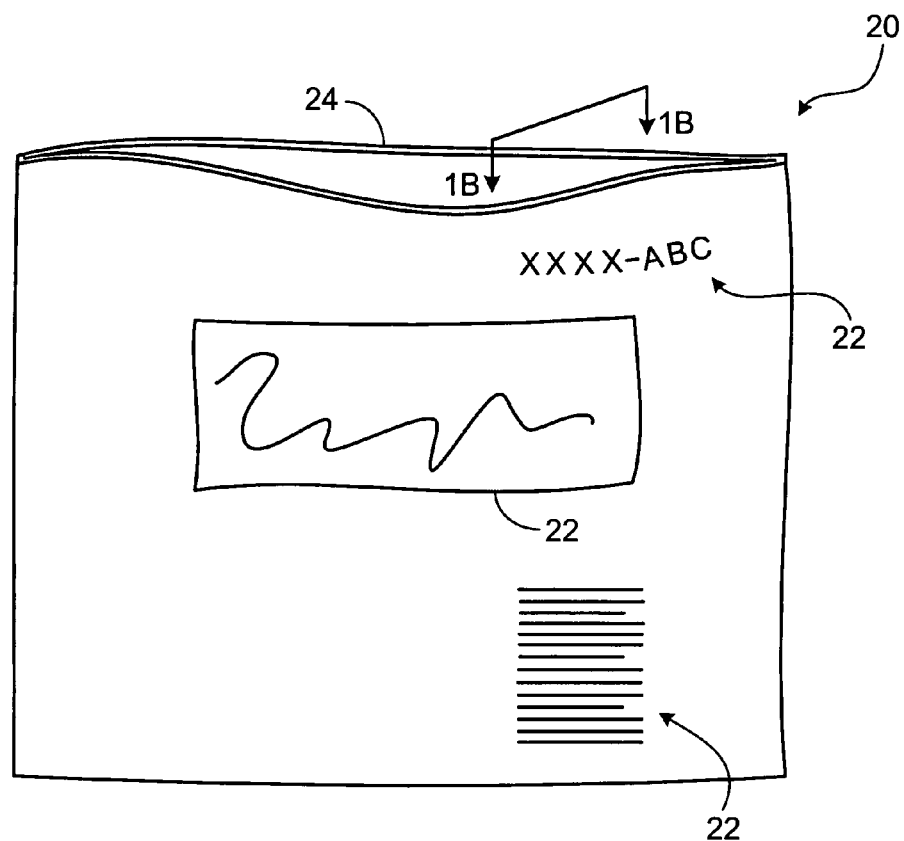
FIG. 1A is a perspective view of an embodiment of a flexible package.
Figure 1B:
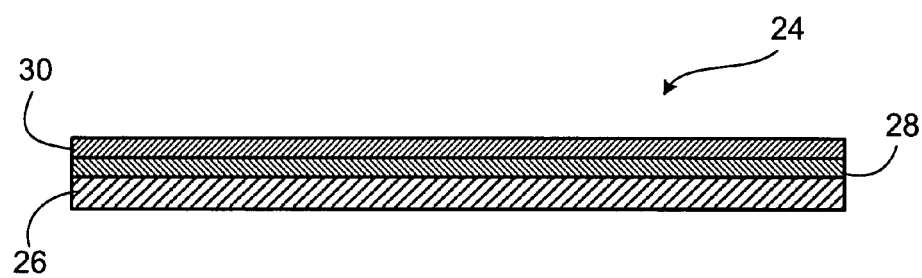
FIG. 1B is a detailed, cross-sectional view of the package of FIG. 1A.

FIG. 1A shows a package 20 that can be used to store and to sell consumer goods, such as baked goods (e.g., pretzels, cookies and chips) and confectionaries. As shown, package 20 bears a variety of marks 22, such as a desired graphic, a list of ingredients, a "use by" date, an expiration date, a bar code, and a lot number. Referring now to FIG. 1B, package 20 is formed of a multilayer structure 24 that (as shown) includes a substrate 26 (a first layer), an exterior protective layer 30 (a second layer) coextensive with the substrate, and a marking composition 28 between the substrate and the protective layer. Substrate 26 (e.g., a metallized polymer layer) can be used to extend the shelf life or freshness of the consumer goods. Marking composition 28 can be used to provide a desired graphic and/or to allow a desired mark to be formed in structure 24, as described below. Protective layer 30 (e.g., a bi-axially oriented polypropylene layer) can be used to protect a formed graphic(s) and/or mark(s) from unwanted changes. In some embodiments, marking composition 28 is applied to protective layer 30, and the protective layer is subsequently laminated to substrate 26 with a molten extrudate (e.g., ethylene-methyl-acrylate (EMA) modified polyethylene) to form multilayer structure 24. Other lamination methods are possible. For example, one or two part liquid systems, e.g., solvent-less or reduced solvent systems, can be used for the lamination in place of, or in addition to the molten resin. For example, the two part system can include a first component that includes an isocyanate component that is monomeric and/or oligomeric and a second component that includes a polyol that is monomeric and/or polymeric. After mixing the two parts, a polyurethane is formed that represents the laminating resin. For example, the one part system can be a moisture cure polyurethane system that can be used on porous materials, such as cellulosic materials. Moisture for the curing of such a system can come from the substrate itself (from retained moisture on the substrate), or the moisture can be applied to the substrate, e.g., by spraying. Generally, the one or two part alternative laminating systems are selected such that when the laminating resin, solvent (if present) and/or unreacted materials come into contact with the activatable marking composition, the marking composition does not react with the resin or components in the resin and remains in an un-activated state (does not change color). In some implementations, it is advantageous to use such one and two part systems to provide packages that are especially thin, e.g., less than 0.5, 0.4, 0.3, 0.2 or even less than 0.1 mil in total thickness and/or that have custom barrier properties that can be adjusted by the laminating material.

Figure 1C:
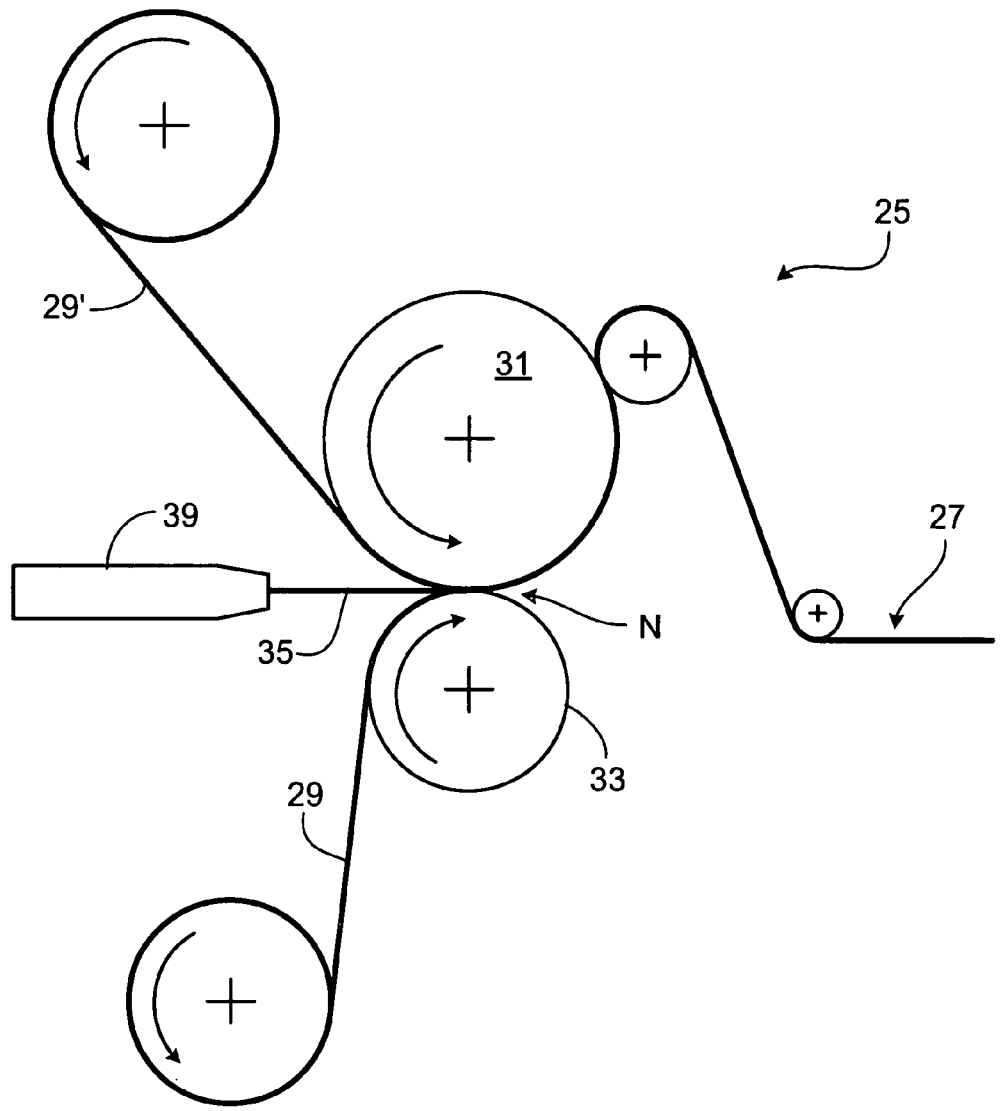
FIG. 1C is a schematic side view of an exemplary extrusion lamination process.

Referring to FIG. 1C, a multi-layer structure can be made by an extrusion laminating process 25. In such a process, sheet-form laminate 27, which in multi-layered in transverse cross-section, may be formed by introducing a first pre-form material 29', such as a metallized polymeric material (e.g., a metallized bi-axially oriented polypropylene), along with a second pre-form material 29 (e.g., bi-axially oriented polypropylene), into nip N defined between a first roll 31 and a second roll 33. One or both of the pre-form materials have a marking material therein and/or thereon, which can be marked by exposing to sufficient heat and/or radiation. For example, the first roll can be made of or can have a surface that has a polymeric material, such as a silicone, and the second roll can be made of a metal, such as a steel, which can, e.g., provide cooling. Thermoplastic resin 35 is extruded as a molten sheet from extruder 39, and is introduced into nip N formed between a the first roll 31 and counter-rotating second roll 33. Pressure and heat in the nip laminates the two pre-form materials together, which can be collected in roll form laminate material.

In some embodiments the second pre-form material has a marking composition thereon, and is introduced into the nip N in a manner that the marking composition is contacted by the resin. The resin encapsulates the marking composition and forms a protective coating over the marking composition.

In some implementations, the line speed is greater than 100 fpm, e.g., 200, 300, 400, 500, or even greater than 750 fpm.

High line speeds can reduce the amount of heat the marking composition sees, which can reduce pre-mature color change. In addition, in some implementations, one or both of the rolls can be maintained at a temperature that is, e.g., more than 100° C. less than the molten resin, e.g., more than 150, 200, 250 or even 300° C. less than that of the molten resin, which can also reduce pre-mature color change.

Surprisingly, we have found that even when the resin just prior to entering the nip is at a temperature above a thermal transition temperature of the marking composition, no color change is observed in the laminated product.

Marking composition 28 can be used to provide a desired graphic, and/or to form a desired mark by applying the marking composition to protective layer 30, and optionally, applying energy, such as electromagnetic radiation, (e.g., lasing) the marking composition to form the desired mark. In particular, the desired graphic (such as a manufacturer's logo) can be formed by applying marking composition 28 to protective layer 30 using techniques such as flexographic printing and gravure printing. Any type of formulation can be applied to protective layer 30 to form composition 28. For example, the formulation can be water-based, solvent-based and/or a curable formulation (e.g., radiation curable). Components of the formulation can be dissolved in solution and/or dispersed in the solvent. While preferred formulations include those used in flexographic printing and gravure printing, inkjet printing, screen printing, pad printing, and other printing forms can be used. In instances where the formulation is a curable formulation, e.g., a UV curable ink composition, a polymerizeable (e.g., crosslinkable) material and, optionally, a photo-initiator can be included. Additionally or alternatively, marking composition 28 can be applied to one or more areas of protective layer 30 that are subsequently addressed with electromagnetic radiation to form the desired mark (such as an expiration date). As discussed herein, marking with electromagnetic radiation can enhance the reliability and cost-efficiency of manufacturing, among other benefits.

Marking composition 28 is generally capable of interacting with electromagnetic radiation (such as from a laser) and/or the heat generated by the radiation to irreversibly form a mark that can be detected visually. In some embodiments, marking composition 28 includes a thermally activatable coloring composition and an absorber capable of producing thermal energy upon irradiation with electromagnetic radiation. The thermally activatable coloring composition can include, for example, a dye and a color developer. Marking composition 28 can further include a solvent and/or a film-forming agent.

As used herein, an "absorber" refers to a material that can produce thermal energy upon irradiation of electromagnetic radiation (e.g., from a laser). Without wishing to bound by theory, it is believed that the absorber can interact with (e.g., absorb) incident energy (e.g., energy having a wavelength of from approximately 200 nm to about 10.6 microns, e.g., approximately 400 nm to approximately 1,200 nm) and generate thermal energy from the incident energy. The thermal energy produced from the absorber can activate the thermally activatable coloring composition in marking composition 28 to form a mark. The absorber is generally stable under common environmental conditions (e.g., at room temperature and under atmospheric pressure). In some embodiments, the absorber is compatible with other materials in marking composition 28 (e.g., by not generating a color change upon mixing with other materials in the marking composition).

In some embodiments, the absorber contains particles having an average dimension (e.g., an average diameter) of at least approximately 0.1 micron (e.g., at least approximately 1 micron) and/or at most approximately 40 microns (e.g., at most approximately 20 microns, at most approximately 15 microns).

The absorber can have a maximum absorption in a broad range of wavelengths, depending, e.g., on the particular marking composition and incident energy used. In some embodiments, an absorber has a maximum absorption wavelength from approximately 400 nm to approximately 1,200 nm (e.g., from approximately 460 nm to approximately 840 nm). Examples of absorbers include KF1151 PINA, KF1152 PINA, KF1026 PINA, SDA7950, SDA1816, Photo dye KF 1126 PINA, Photo dye KF 1127 PINA, SDA 4927, SDD 5712, KF839TS, A-183, SDA1037, PJ 800NP, and PJ 830NP. All KF PINA materials are available from Honeywell, Seelze GmbH (Seelze, Germany). All SDD and SDA are available from H. W. Sands (Jupiter, Fla.). PJ800NP and PJ830NP are available from Avecia (Manchester, UK). In some embodiments, an absorber has a maximum absorption wavelength from approximately 8,000 nm to approximately 12,000 nm. Examples of absorbers include hydrous aluminosilicates, Mearlin Magnapearl 3100 (41.0-53.0% titanium dioxide, 0.35-0.83% tin dioxide, 46.0-59.0% mica), Engelhard Alsibronz 6 Mica (100% mica (CAS #12001-26-2)), Neogen 2000 (China clay (CAS #86402-68-4)), ASP G90 Kaolin Clay (hydrous kaolin (CAS #1332-58-7)), and ASP 170 Kaolin Clay (100% hydrous kaolin powder or aluminum silicate (CAS #1332-58-7)). Mearlin Magnapearl 3100, Engelhard Alsibronz 6 mica, and ASP170 and G90 are available from Engelhard Corp. (Iselin, N.J. or North Charleston, S.C.), and Neogen 2000 is available from Imerys (Paris, France).

In some embodiments, the absorber is substantially transparent within the 400-700 nm region. As used herein, a "transparent absorber" refers to a material that, when used in a marking composition, transmits at least about 80% (e.g., at least about 85%, at least about 90%) of light within the 400-700 nm region. In certain embodiments, the absorber has a white color or another suitable color.

A marking composition can include two or more different absorbers. In some embodiments, each absorber has a maximum absorption wavelength different from those of other absorbers. For example, an absorber having a maximum absorption at approximately 780 nm can be combined with another absorber having a maximum absorption at approximately 820 nm to provide a marking composition that has a broadened region of strong absorption within the entire range of 780-820 nm. Such compositions can be particularly useful if wavelength shifts occur with photonic energy sources due to increases in operating temperature.

In some embodiments, the absorber(s) is at least approximately 1 wt % (e.g., at least approximately 4 wt % or at least approximately 8 wt %), and/or at most approximately 20 wt % (at most approximately 16 wt % or at most approximately 12 wt %) of a marking composition. For example, a marking composition can include approximately 10 wt % of the absorber(s). In other embodiments, e.g., for absorbers that absorb at approximately 808 nm, the absorber is at most approximately 1 wt %, or at least approximately 0.05 wt % of a marking composition.

As used herein, a "thermally activatable coloring composition" refers to a composition that can generate a color change (e.g., an irreversible color change) upon exposure to a selected stimulus, such as a sufficient amount of thermal energy. In some embodiments, the color change can be from a first color (e.g., white) or no color to a second contrasting color (e.g., black or purple). A thermally activatable coloring composition is generally stable under common environmental conditions (e.g., at room temperature and under atmospheric pressure). Preferably, a thermally activatable coloring agent is compatible with other materials in a marking composition (e.g., without generating color change upon mixing with other materials in the marking composition). For example, the thermal energy can be provided by a laser, a thermal printhead, a hot gas jet, such as a hot air jet, or a hot filament immediately adjacent the marking composition.

As indicated above, in some embodiments, the thermally activatable coloring composition includes a dye, such as a leuco dye. The chemistry and formulation of leuco dye compositions are known in the art, such as those described in U.S. Pat. Nos. 3,539,375; 3,674,535; 4,151,748; 4,181,771; 4,246, 318; and 4,470,057, the contents of which are incorporated herein by reference. Examples of leuco dyes include those available from Ciba Specialty Chemicals (Basel, Switzerland) under the Pergascript line, such as Pergascript Yellow I3R, Pergascript Green I-2GN, Pergascript Orange I-G, Pergascript Red I-6B, Pergascript Blue S-RB, Pergascript Blue I-2R, Pergascript Black I-R, and Pergascript Black I-2R.

In some embodiments, the thermally activatable coloring composition also includes a color developer that is capable of reacting with the dye to produce a color change. Examples of color developers include acids or materials capable of generating an acid moiety, for example, upon reaching a particular threshold (e.g., by heating to a particular temperature).

For example, Ciba® PERGAFAST™ 201, a room temperature solid available from Ciba Specialty Chemicals, can provide an acidic moiety for color development of leuco dyes when activated with heat. Other room temperature solid materials, such as some hindered phenols (e.g., 4,4'-isopropylidenebis(2,6-dibromophenol) (Aldrich) where the acidic hydrogen on the hydroxyl group is hindered from physically contacting the leuco dye), can also serve as a source of an acid moiety. The solid materials can undergo a melt phase to allow the acidic moiety to have intimate contact with the leuco dye. As a result, phenols or other hindered acidic color developers can be chosen based on their melting points. Other examples of color developers include pre-acids, which can be described as molecules that can undergo a structural change to present an acidic moiety. In some embodiments, the structural change that occurs is the elimination of one or more groups that leads to a rearrangement and presents an acidic moiety. Examples of pre-acids are available from Midori Kagaku Co., Ltd., (Toshima-Ku, Tokyo) and include, for example, 4-Nitrobenzyl tosylate (tradename NB-201), Bis(4-tert-butylphenyl)iodonium triflate (tradename BBI-105), 5-Norborn-2,3-dicarboximidyl tosylate (tradename NDI-101), Alpha-[[[(4-Methylphenyl)sulfonyl]oxy]imino] benzeneacetonitrile (tradename PAI-01), 4-Methoxyphenylpenyliodonium triflate (tradename MPI-105), 4-Methoxy-alpha[[[(4-methylphenyl)sulfonyl]oxy]imino]benzeneacetonitrle (tradename PAI-101), 2-(3,4-Dimethoxyphenyl)-4,6-bis-(trichloromethyl)-1,3,5-triazine (tradename TAZ-108), 2,4, 6-Tris(trichloromethyl)-s-triazine (tradename TAZ-101), which develop into a green/black or black color between a temperature of approximately 95-180° C. Still other examples of pre-acids include ionic pairs (e.g., salts) of acids, commonly referred to as blocked acids. For example, amine salts of para-toluene sulfonic acid, such as Nacure 2170 (King Industries Inc., Norwalk, Conn.), which is described as a para-toluene sulfonic acid with an activation temperature of 90° C. may be used. The amine group, which acts as a blocking group and is used in creating the salt, can be responsible for the temperature where the acid is regenerated through decomposition of the ionic pair, thereby providing a trigger for color development. By knowing when the acidic moiety is formed (e.g., the melting point of the solid material, when a structural change occurs, or the activation temperature of blocked acid) and selecting the desired color developer, a desired color development can be achieved. Also, by selecting the appropriate color developer, certain events, such as premature color development from interactions between the acid and the leuco dye caused by a lamination process, can be prevented.

Generally, exposing a masked colorant in or on a substrate to a sufficient amount of energy (e.g., from radiation and/or heat) to unmask the colorant produces a mark on the substrate. Upon exposure to sufficient energy, the masked colorant undergoes a chemical reaction, which shifts the masked colorant from a state where the color is either absent or reduced (e.g., clear or white) to an unmasked state where the colorant is in a colored chemical form (e.g., blue). A masked colorant in the leuco form is generally protected, e.g., such that upon exposure to sufficient radiation and/or heat, which is absorbed by component(s) in the composition 28, and conversion of the absorbed radiation to thermal energy to deprotect the colorant. The deprotected leuco form of the colorant is oxidized to provide a colored form of the colorant. Leuco indigo and leuco methylene blue are examples of masked colorants. BLMB (N-benzoylleucomethylene blue) is an especially preferred masked colorant in some embodiments.

Preferred protecting groups include carbonate protecting groups such as ethyl carbonate, silicon protecting groups such as TMS, TiPS, and TBS, and benzyl protecting groups such as benzoyl. Other O-protecting groups (for example, acetyl: both the acetyl- and the ethyl acetoacetyl-O-protected indigo compounds have been reported previously: Setsune, J. I, et al., J. Chem. Soc. Perkin Trans. I, 1984, 2305) on indigo could be considered as they may serve to lower the energy requirements for such a transformation. The masked colorants described herein are beneficial because they generally do not require the use of a solvent to produce a color. For example, because, in some embodiments, the masked colorant does not require reacting with a second component to transform into a colored state, there is little to if any barrier to color formation.

An example of the chemical processes that occur in the unmasking of a colorant is provided below:

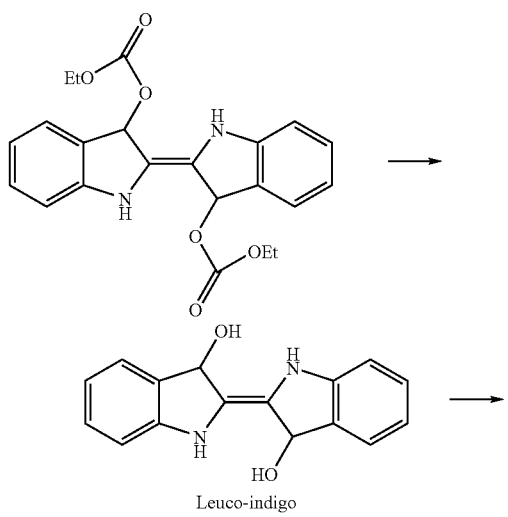

Leuco-indigo

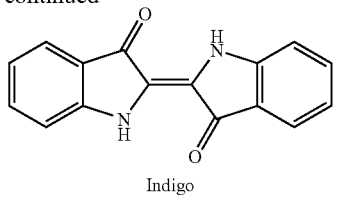

Indigo

A colorless ethyl carbonate (above) can be the masked colorant component of the component 28. When the composition is exposed to a light source, e.g., a diode laser or a $CO_2$ laser, and absorption of the light by one component or multiple components in the composition results in the generation of thermal energy to liberate the masking agent followed by oxidation of the colorant to a more colored state. As shown above, the energy provided by the light source is sufficient to generate the thermal energy required for removing the protecting group. The unprotected leuco-indigo is subsequently oxidized, e.g., by exposure to air, thereby providing a colored indigo, which provides a marking. A similar scheme is effective when employing protected adducts of methylene blue and other protected indigoid compounds.

Use of an absorber may enhance this reaction. Further, use of an acid, a blocked acid or base may serve to enhance this reaction.

Another example of the chemical processes involved in unmasking of a colorant is provided below for the case of formulation that includes N-benzoylleucomethylene blue dye and a clay absorber.

when it is a hydrated clay, to hydrolyze the N-benzyolleucomethylene blue to colorless leucomethylene blue, producing benzoic acid. Leucomethylene blue is rapidly oxidized to the blue-colored methylene blue. The color change occurs in the vicinity of the absorbed radiation and/or heat to produce a mark on the composition.

Without wishing to be bound by any particular theory, it is believed that the solid N-benzyolleucomethylene blue heats up until it flows and comes into contact with the clay. The clay it is believed has acidic and/or basic sites (or metallic impurities, such as iron) that catalyze the hydrolysis reaction to produce the leucomethylene blue. Leucomethylene blue is then rapidly oxidized to the blue-colored methylene blue (especially at elevated temperatures). The kinetics of the hydrolysis reaction and oxidation reaction are described in Gensler et al., Journal of Organic Chemistry, 31, No. 7 (1966), 2324-2330.

In some embodiments, acidic clays are preferred, e.g., those generate a pH of from about 3 to about 6, or from about 3.5 to about 5.5 when slurried at 5 weight percent in deionized water.

In some embodiments, the materials of the thermally activatable coloring composition (e.g., the dye and the color developer) are dispersed as solid particles, but not dissolved, in a solvent. Without wishing to the bound by theory, it is believed that the dye and the color developer in such a marking composition are separated into two phases, thereby reducing (e.g., preventing) any reaction between them, e.g., before the application of heat. In some embodiments, at least approximately 90 wt % (e.g., at least approximately 95 wt %

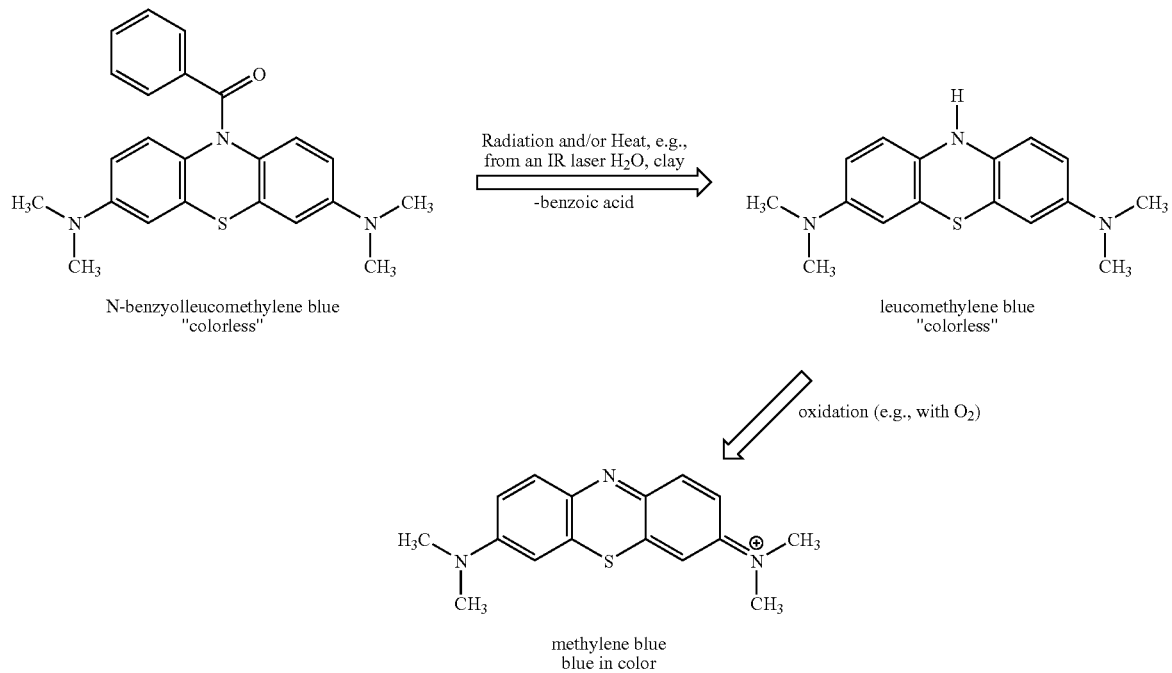

A formulation that includes N-benzyolleucomethylene blue, a clay, such as an acid or basic clay, and a polymeric binder, such as a PVB or nitrocellulose is initially white to off-white (generally, the color of the clay itself). After the formulation absorbs radiation and/or heat, e.g., from an IR laser, the N-benzyolleucomethylene blue reacts with water in the formulation, e.g., from the matrix or from the clay itself or at least approximately 99 wt %) of the dye does not react with the color developer before the application of heat. After being heated to a selected (e.g., activation) temperature, it is believed that the dye and the color developer melt into one phase and react with each other to generate a color change. In other embodiments, such as where a pre-acid is present, the dye and/or the color developer may be dissolved into a solvent, and a color change is not realized until a threshold (e.g., a threshold temperature) is reached. This threshold may be, for example, a physical or a structural change, such as a loss of an amino blocking group (e.g., in an ionically paired blocked acid compound) or a structural rearrangement where the acidic moiety is generated. Other examples of activatable coloring compositions that can be utilized in some embodiments are the Kromagen line of products, such as K90, K120, and K170 and KS170, from Thermographic Measurements Co. Ltd. (Flintshire, UK), which are examples of non-encapsulated leuco-color developer color activatable systems.

A marking composition can include two or more different thermally activatable coloring compositions. For example, one or more thermally activatable coloring compositions can generate a color change different from one or more other different thermally activatable coloring compositions. In some embodiments, each thermally activatable coloring composition has a threshold (e.g., an activation temperature or structural change) different from those of other different thermally activatable coloring compositions.

A marking composition generally contains a sufficient amount of one or more thermally activatable coloring compositions to produce a visible color change during marking. In some embodiments, the thermally activatable coloring composition(s) is at least approximately 10 wt % (e.g., at least approximately 20 wt % or at least approximately 40 wt %), and/or at most approximately 50 wt % (e.g., at most approximately 45 wt % or at most approximately 40 wt %) of a marking composition. In other embodiments, the thermally activatable coloring composition(s) constitutes up to 100 wt % of a marking composition.

As indicated above, in some embodiments, a marking composition includes a solvent that is compatible with the other material(s) in the marking composition. For example, the solvent does not generate a premature color change, e.g., by dissolving the color developer. The solvent can include water or an aqueous solution, such as one that contains an amine or other pH modifier or surfactant. Exemplary amines used with aqueous solutions include monoethanolamine. Surfactants for water-borne coatings are well known in the art and may include surface tension modifiers, flow and leveling agents, and the like. Organic solvents can also be used and can include any solvent that is suitable for the application of the marking composition, and/or capable of dissolving other materials in the marking composition. Exemplary organic solvents include ethyl alcohol, propyl alcohol, isopropyl alcohol, acetone, ethyl acetate, propyl acetate, and similar solvents. In some embodiments, organic solvents with pre-acids in which no background color development is realized are used. The amount of the solvent can range, for example, from approximately zero wt % (e.g., for dry marking compositions) to approximately 80 wt %, and can be adjusted based on the desired viscosity of the marking composition. For example, the viscosity can be adjusted to meet one or more requirements of the marking process in which the marking composition is to be used. Viscosities can range, for example, from approximately 200 to approximately 1500 cPs for flexographic printing; from approximately 1500 to approximately 3000 cPs for reciprocal pad printing; and from approximately 35,000 to approximately 55,000 cPs for screen printing.

In some embodiments, a marking composition contains one or more film-forming agents that facilitate film formation from the marking composition. Examples of film-forming agents include acrylic resins or urethane resins. Commercially available acrylic resins include JONCRYL 2621 and JONREZ 2064, from Johnson Polymer (Sturtevant, Wis.); Lucidene 351, Lucidene 243, Lucidene 604, Lucidene 605, and Lucidene 605NV, from Rohm & Haas (Philadelphia, Pa.); Rhoplex 3208 and Rhoplex CL-105 from Rohm and Haas (Philadelphia, Pa.); Neocryl BT44, NeoCryl 1127, NeoCryl 1120, NeoCryl 1052, and NeoCryl 5090 from DSM Neoresins (Wilmington, Mass.); Carboset GA1604, Carboset GA1993, and Carboset GA2236 from Noveon Inc. (Cleveland, Ohio); Zinpol 280 from Noveon Inc. (Cleveland, Ohio); and Glascol LE15 from Ciba Specialty Chemicals (Tarrytown, N.Y.). Commercially available urethane resins include UROTUF L56MPW36 from Reichold (Durham, N.C.); and NeoRez 563, NeoRez 551, NeoRez R-972, NeoRez R-9621, NeoRez R-966, and NeoRez R-940 from DSM Neoresins (Wilmington, Mass.). Other film-forming agents include polyvinyl alcohol, casein, starch, methyl cellulose, ethyl cellulose, styrene-butadiene latex, polyvinyl butyral and the like. INX Flexo Lamial II inks (solvent based flexographic printing inks) and INX LAM (water based inks) are available from INX International Ink. The film forming agent can be an acrylic resin. The amount of the film forming agent(s) can be determined by, for example, the amount of solids in the marking composition and/or the ability to laminate packaging 20 (FIG. 1A) adequately after printing.

Any marking composition or formulation used to prepare a marking composition can contain one or more polymerizable monomers (e.g., crosslinkable monomers). The polymerizable monomers can be mono-functional, di-functional, and tri- or higher functional material. The mono-, di-, tri-, and higher functional materials have, respectively, one, two, three, or more unsaturated carbon-carbon groups, which are polymerizable by irradiating, e.g., with ultraviolet light radiation. Examples of the unsaturated carbon-carbon groups include vinyl and vinylidene groups. Some preferred compositions and formulations include at least about 40%, more preferably from about 60% to about 90%, by weight of the polymerizable monomers and the diluents. In some embodiments, the compositions and formulations include greater than or equal to about 40%, 45%, 50%, 55%, 60%, 65%, 70%, 75%, 80%, 85%, 90%, or 95% by weight of the polymerizable monomers; and/or less than or equal to 95%, 90%, 85%, 80%, 75%, 70%, 65%, 60%, 55%, 50%, or 45% by weight of the polymerizable monomers.

A mono-functional material can contain a single monomer or a mixture of monomers. The mono-functional material can be a straight or branched chain acrylate of an alcohol, or an acrylate of cyclic or polycyclic alkanols. Examples of the mono-functional materials include long chain aliphatic acrylates (e.g., lauryl acrylate or stearyl acrylate) and acrylates of alkoxylated alcohols (e.g., 2-(2-ethoxyethoxy)-ethyl acrylate. The mono-functional material need not necessarily be an acrylate. For example, methacrylate, vinyl, vinyl ether, or 1-propenyl ether may be used.

A di-functional material can contain a single monomer or a mixture of monomers. The di-functional material can be a diacrylate of a glycol or a polyglycol. Examples of the diacrylates include the diarylates of diethylene glycol, hexanediol, dipropylene glycol, tripropylene glycol, cyclohexane dimethanol (Sartomer CD406), and polyethylene glycols.

A tri- or higher functional material can contain a single monomer or a mixture of monomers. Examples of tri- or higher functional materials include tris(2-hydroxyethyl)-isocyanurate triacrylate (Sartomer SR386), dipentaerythritol pentaacrylate (Sartomer SR399), and alkoxylated acrylates (e.g., ethoxylated trimethylolpropane triacrylates (Sartomer SR454), propoxylated glyceryl triacrylate, and propoxylated pentaerythritol tetraacrylate).

Another example is a mixture of materials including epoxy acrylate, polyamide, monomers, and optionally acrylated polyamide, such as via Michael addition. Such a mixture is available as RM-370 from Cognis (Cincinnati, Ohio) and are described in U.S. Pat. Nos. 5,804,671, 5,889,076, 6,239,189, and 6,316,517, all hereby incorporated by reference in their entirety.

The composition and formulations can also contain one or more multi-functional oligomers or polymers. The oligomer or polymer can contain any suitable compound or mixture of compounds that contain one or more unsaturated carbon-carbon bonds, and may react with monomers upon radiation curing. Examples of the oligomers or polymers include polyacrylates such as urethane acrylates and epoxy acrylates.

Any marking composition or any formulation used to prepare a marking composition can include one or more photointiators. A photoinitiator, e.g., a blend, in the compositions and formulations is capable of aiding in the initiation of polymerization reactions upon irradiation (e.g., with ultraviolet light irradiation), e.g., a blend capable of producing free radicals. The photoinitiating system may initiate a ring opening polymerization reaction, a free radical polymerization reaction, or a cationic reaction.

The photoinitiating system can include the following components: an aromatic ketone photoinitiator, an amine synergist, an alpha-cleavage type photoinitiator, and/or a photosensitizer.

An aromatic ketone photoinitiator can be an aromatic ketone that undergoes homolysis by two processes (often simultaneously): fragmentation and hydrogen abstraction, in which the hydrogen abstraction occurs in the presence of a hydrogen donor. In general, the aromatic ketone has a benzophenone skeleton. Examples of the aromatic ketones include, but are not limited to, 4-phenylbenzophenone, dimethyl benzophenone, trimethyl benzophenone (Esacure TZT), and methyl O-benzoyl benzoate.

An amine synergist can be an amine, as well as a hydrogen donor with abstractable hydrogens. For example, the amine synergist is a tertiary amine. Examples of the amine synergists include, but are not limited to, 2-(dimethylamino)-ethyl benzoate, ethyl 4-(dimethylamino) benzoate, and amine functional acrylate synergists (e.g., Sartomer CN384, CN373).

An alpha-cleavage type photoinitiator can be an aliphatic or aromatic ketone that undergoes homolysis at the alpha position of the carbonyl group by one process: fragmentation. Examples of the alpha-cleavage type photoinitiators include, but are not limited to, 2,2-dimethoxy-2-phenyl acetophenone, 2,4,6-trimethylbenzoyl-diphenylphosphine oxide, and 2-methyl-1-[4-(methylthio)phenyl-2-morpholino propan-1-one (Irgacure 907).

A photosensitizer can be a substance that either increases the rate of a photoinitiated polymerization reaction or shifts the wavelength at which the polymerization reaction occurs. The photosensitizer can extend the range of an alpha-cleavage type photoinitiator by absorbing radiation into the visible wavelength, and transferring the energy to the alpha-cleavage type photoinitiator. Examples of photosensitizers include, but are not limited to, isopropylthioxanthone (ITX), diethylthioxanthone, and 2-chlorothioxanthone.

Any marking composition or formulation can contain an adjuvant such as a vehicle (e.g., a wax or resin), a stabilizer, an oil, a flexibilizer, or a plasticizer. The stabilizer can inhibit oxidation of the marking composition or formulation used to prepare the composition. The oil, flexibilizer, and plasticizer can reduce the viscosity of the formulation.

Examples of waxes include, but are not limited to, stearic acid; succinic acid; beeswax; candelilla wax; carnauba wax; alkylene oxide adducts of alkyl alcohols; phosphate esters of alkyl alcohols; alpha alkyl omega hydroxy poly (oxyethylene); allyl nonanoate; allyl octanoate; allyl sorbate; allyl tiglate; rice bran wax; paraffin wax; microcrystalline wax; synthetic paraffin wax; synthetic paraffin and succinic derivatives; petroleum wax; synthetic petroleum wax; cocoa butter; diacetyl tartaric acid esters of mono and diglycerides; mono and diglycerides; alpha butyl omega hydroxypoly(oxyethylene)poly(oxypropylene); calcium pantothenate; fatty acids; organic esters of fatty acids; amides of fatty acids (e.g., stearamide, stearyl stearamide, erucyl stearamide (e.g., Kemamide S-221 from Crompton-Knowles/Witco)); calcium salts of fatty acids; mono & diesters of fatty acids; sucrose fatty acid esters; calcium stearoly-2-lactylate; Japan wax; lanolin; glyceryl hydroxydecanoate; glyceryl hydroxydodecanoate; oxidatively refined montan wax fatty acids,; polyhydric alcohol diesters; oleic acids; palmitic acid; d-pantothenamide; polyethylene glycol (400) dioleate; polyethylene glycol (MW 200-9,500); polyethylene (MW 200-21,000); oxidized polyethylene; polyglycerol esters of fatty acids; polyglyceryl phthalate ester of coconut oil fatty acids; shellac wax; hydroxylated soybean oil fatty acids; stearyl alcohol; and tallow and its derivatives.

Examples of resins include, but are not limited to, acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200-3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

Examples of stabilizers, oils, flexibilizers and plasticizers include, but are not limited to, methylether hydroquinone (MEHQ); hydroquinone (HQ); Genorad 16 (a free radical stabilizer from Rahn Corp.); butylated hydroxyanisole (BHA); butylated hydoxytoluene (BHT); propyl gallate; tert-butyl hydroquinone (TBHQ); ethylenediaminetetraacetic acid (EDTA); methyl paraben; propyl paraben; benzoic acid; glycerin; lecithin and modified lecithins; agar-agar; dextrin; diacetyl; enzyme modified fats; glucono delta-lactone; carrot oil; chincona extract; rapeseed oil; pectins; propylene glycol; peanut oil; sorbitol; acetophenone; brominated vegetable oil; polyoxyethylene 60 sorbitan mono stearate; olestra; castor oil; oiticia oil; 1,3 butylene glycol; coconut oil and its derivatives; corn oil; substituted benzoates; substituted butyrates; substituted citrates; substituted formates; substituted hexanoates; substituted isovalerates; substituted lactates; substituted propionates; substituted isobutyrates; substituted octanoates; substituted palmitates; substituted myristates; substituted oleates; substituted stearates, distearates and tristearates; substituted gluconates; substituted undecanoates; substituted behenates; substituted succinates; substituted gallates; substituted heptanoates; substituted phenylacetates; substituted cinnamates; substituted 2-methylbutyrates; substituted tiglates; corn syrup; isoparaffinic petroleum hydrocarbons; mineral oil; glycerin; mono- and diglycerides and their derivatives; olibanum oil; opopanax is oil; peanut oil; polysorbates 20, 60, 65, 80; propylene glycol mono- and diesters of fats and fatty acids; epoxidized soybean oil; hydrogenated soybean oil; sperm oil; and hydrogenated sperm oil.

Any marking composition or formulation used to prepare the composition can also include a polymeric dispersant. The polymeric dispersant can assist in stabilizing the colorant in the ink. The dispersant can, e.g., prevent agglomeration of the colorant or any component of a formnulation used to make the marking composition. The ink can include between about 1% and 10% by weight dispersant (e.g., between about 3% and 8% by weight dispersant).

Examples of dispersants include Solsperse 13,650, 13,940, 17,000, 24,000, 32,000, 36,000; Byk 108; Tego Dispers 700; UNIQEMA 5543; and EFKA 5244, 5207, 6750; which are all commercially available from Avecia; Byk Chemie; Tego Chemie; Zephryn Uniquema; and EFKA additives, respectively.

The amount of dispersant used is generally based on the amount of colorant in the composition or formulation (e.g., the surface area of pigment particles in grams per meter squared). The selected dispersant can be soluble in the vehicle, can lack volatility at an elevated temperature (e.g., 120° C.), and can have good affinity for the pigment. The dispersant can also include a synergist that aids dispersion.

In addition to or in place of a dispersant, a surfactant compound can be used. The surfactant compound can serve to alter the surface tension of the formulation used to prepare a composition, and can be an anionic, cationic, nonionic or amphoteric surfactant compound, such as those described in McCutcheon's Functional Materials, North American Edition, Manufacturing Confectioner Publishing Co., Glen Rock, N.J., pp. 110-129 (1990). Examples of surfactants include copolymers such as SILWET® copolymers including Silwet L-7604, available from Crompton, OSi Specialties division. The copolymers are generally comprised of ethylene oxide, propylene oxide, and/or silicone. Other examples of surfactants include 3M FC430 available from 3M of St. Paul, Minn. and F50-100 available from DuPont Chemicals of Wilmington, Del.

A marking composition can also contain other additives, such as a leveling agent or surface wetting agent (e.g., BYK®-307, BYK®-310 and BYKO®-331) or a rheology modifier (e.g., DISPERBYK®-110) both from Byk-Chemie (Wesel, Germany). Still other additives, such as a defoamer, a material that can wet out a surface of a substrate, and/or those common in the printing industry, can be used in a marking composition.

A marking composition can be prepared by the following methods. A predetermined amount of a thermally activatable coloring composition and water can first be added into a vessel to form a mixture. While the mixture is being stirred, a predetermined amount of an absorber can then be added slowly. The resultant mixture can be stirred at a high speed to obtain a dispersion containing particles of a certain size (e.g., <10 microns). A film-forming agent and other additives can then be added, and the mixture thus obtained can be stirred at a low speed until a homogenous mixture is obtained. In some embodiments, such as for water-based marking compositions, the mixture can be adjusted to a certain pH (e.g., >7.5 by addition of an amine, such as monoethanol amine) to control the drying speed of the marking compositions.

In some preferred embodiments, the formulation used to prepare the marking composition is applied to a substrate using flexography printing, which is a process commonly used to print packaging materials such as corrugated containers, folding cartons, multiwall sacks, laminated sacks, paper sacks, plastic bags, milk and beverage cartons, disposable cups and containers, labels, adhesive tapes, envelopes, newspapers, and wrappers (candy and food).

In some embodiments, the formulation is printed directly onto a substrate.

In some embodiments, the formulation is applied to a laminated substrate, such as a disposable packaging for a food product. The ink is generally applied between a base layer and a laminate, for example a semi-porous laminate. The ink composition can be applied at any time convenient in the packaging process. Upon application of the formulation, the colorant is in the masked form. The colorant can be unmasked upon application of radiation sufficient to shift the masked colorant to an unmasked state, thereby providing a marking.

In some embodiments, the formulation is applied to a substrate at least about 1 hour (e.g., at least about 2 hours, at least about 4 hours, at least about 12 hours, at least about 1 day, at least about 2 days, at least about 3 days, at least about 1 weeks, at least about 2 weeks, at least about 1 month, at least about 2 months, at least about 3 months, at least about 4 months, at least about 5 months, or at least about 6 months) before the resulting marking composition is treated with energy sufficient to unmask the colorant.

Still referring to FIG. 1B, protective layer 30 can include any material capable of allowing at least a portion of incident electromagnetic radiation to be transmitted to interact with marking composition 28 and to form a mark. In some embodiments, at least approximately 20% (e.g., at least approximately 30%, at least approximately 40%, at least approximately 50%, at least approximately 60%, at least approximately 70%, at least approximately 80%) of the incident electromagnetic radiation (e.g., laser energy) is transmitted through protective layer 30. Protective layer 30 can include one or more polymers, such as polyethylene, polyester and polypropylene. More than one protective layer, such as multiple laminated protective layers, can be used. The total thickness of protective layer(s) 30 can range from approximately 0.1 mil (thousandth of an inch) to approximately 1.5 mil.

Substrate 26 (another layer of structure 24) can include any material capable of supporting or being supported by marking composition 28 and/or protective layer 30. Examples of substrate 26 include a flexible film or a rigid film (e.g., a polymer film), label stock and coated fabric label tape. A specific example of substrate 26 is metallized polypropylene used in the food packaging industry. In other embodiments, substrate 26 include glass, metals, fiber or paper board, paper stock, corrugated, chip board, rigid plastics and semi-rigid plastics. More than one substrate, such as multiple layers of laminated substrates, can be used. The total thickness of substrate(s) can range from approximately 0.1 mil to approximately 4 mils.

Examples of materials for package 20 and applications include, but are not limited to, blister packs, skin packs, vacuum packages, caps, lids, tubs, closures, form/fill/seal packages (both those filled horizontally and vertically), wrappers (such as clear overwraps), bottles, and cans. Other applications on which marking can be accomplished include fabric label tape, labels and the products themselves (e.g., by applying a marking composition on the product).

Multilayer structure 24 can be made according the following methods. Marking composition 28 can be applied onto protective layer 30 in selected portion(s) via a suitable method, such as flexographic printing, gravure printing, spray printing, pad printing, flood coating, and screen printing. In some embodiments, marking composition 28 forms a layer having a thickness ranging from approximately 1.0 micron to approximately 25 microns on protective layer 30. Marking composition 28 can be dried (e.g., air dried). Next, protective layer 30 with marking composition 28 applied thereon can be applied (e.g., laminated) to substrate 26. For example, an adhesive (such as an extrudate including ethylene methyl acrylate-modified polyethylene at approximately $\geq 550°$ F.) can be applied between protective layer 30 and substrate 26, and the protective layer and the substrate can be passed between two rollers (e.g., calendered between a pressure roller and a chilled roller) to form multilayer structure 24. Even at these high temperatures (e.g., approximately $\geq 550°$ F.), marking composition 28 does not prematurely develop a color (e.g., due to the dye and the color developer contacting via a melt or generation of an acid). In some embodiments, marking composition 28 is applied to substrate 26, alternatively or additionally to applying the marking composition to protective layer 30. Examples of multilayer structures include those containing oriented polypolypropylene (OPP), metallized OPP, cavitated OPP, metallized cavitated OPP, poly (vinylidene chloride) (PVDC), PVDC/OPP, polyethylene (PE), and/or metallized PE. These materials can be used, for example, as materials for the substrate and/or the protective layer.

To form a mark, electromagnetic radiation is applied to marking composition 28. For example, laser energy can be passed through protective layer 30 to address marking composition 28 for a certain amount of time. Without wishing to be bound by theory, it is believed that the incident electromagnetic radiation can be absorbed by the absorber in marking composition 28 to produce thermal energy, which in turn can generate a color change from the thermally activatable coloring composition. Examples of sources that can deliver electromagnetic radiation having a wavelength from about 400 nm to 1,200 nm include lasers of the type Cr:Forsterite (1150-1350 nm), HeNe (1152, 612, 594, and 543 nm), argon (1090, 501.7, 496.5, 488, 476.5, and 457.9 nm), Nd:YAG (1080 nm), Nd:YAG (1064 nm), Nd:glass (1060 nm), YbYAG, ErYAG, NdYVO$_4$, NdGdVO$_4$, Nd:YLF (1053 or 1047 nm), Ti:sapphire (700-1000 nm), GaAs/GaAlAs (780-905 nm), GaP, InGaP, GaN, InGaAs (980 nm), krypton (799.3, 752.5, 676.4, 647.1, 568.2 or 530.9 nm), Cr:LiSAF (780-1060 nm), InP, ruby (694 nm), InGaAlP (635-660 nm), Cu (578 and 511 nm), HeCd (442 nm), N2+(428 nm) and GaInP. In some embodiments, the electromagnetic radiation generated by a laser can have an energy density from approximately 0.40 J/cm$^2$ to approximately 1 J/cm$^2$.

Marking composition 28 can be addressed for at least approximately 50 microseconds to approximately 1 second to generate an optically detectable mark, e.g., a pixel of approximately 250 micrometers. Examples of marks that can be generated include a number, a letter, a word, a bar code, a graphic (such as a trademark or a logo), and a graph.

Examples of radiation sources (e.g., a laser beam source employable herein) include excimer lasers, argon lasers, helium neon lasers, semiconductor lasers, solid state YAG lasers, carbon dioxide gas lasers, and dye lasers. Useful among these laser beam sources are helium neon laser, semiconductor laser, and gas laser. In preferred embodiments, the colorant is unmasked using a laser, such as a CO$_2$ diode laser. It is preferred that the colorant be unmasked using a power of less than about 10 W, e.g., less than about 9 W, less than about 8 W, less than about 7 W, less than about 6 W, less than about 5 W, less than about 4 W, less than about 3 W, less than about 2 W or less than about 1 W. It is preferred that the colorant be unmasked using an energy source of less than about 10 J/cm$^2$, less than about 9 J/cm$^2$, less than about 8 J/cm$^2$, less than about 7 J/cm$^2$, less than about 6 J/cm$^2$, less than about 5 J/cm$^2$, less than about 4 J/cm$^2$, less than about 3 J/cm$^2$, less than about 2 J/cm$^2$, or less than about 1 J/cm$^2$.

The fluence needed to visibly mark a particular coating can, among many other factors, depend upon coating thickness. For example, for relatively thick coatings, relatively small fluence values may be needed.

In preferred embodiments, the radiation has a wavelength that is greater than about 700 nm or 800 nm or 900 nm or 1000 nm. In some other preferred embodiments, the radiation has a wavelength of about 700 nm to about 10.6 microns.

Figure 2A:
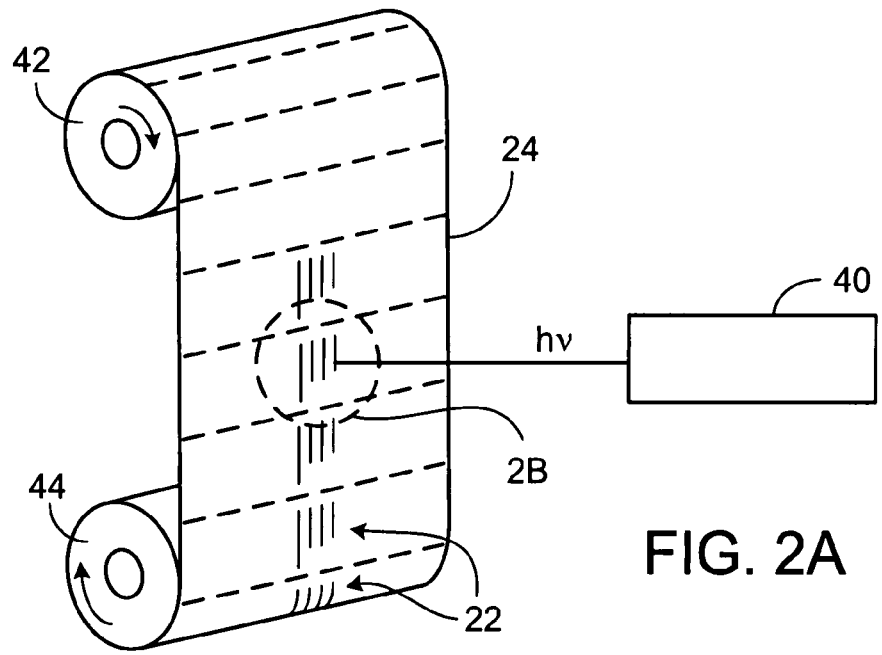
FIG. 2A is schematic diagram of an embodiment of a method of marking.
Figure 2B:
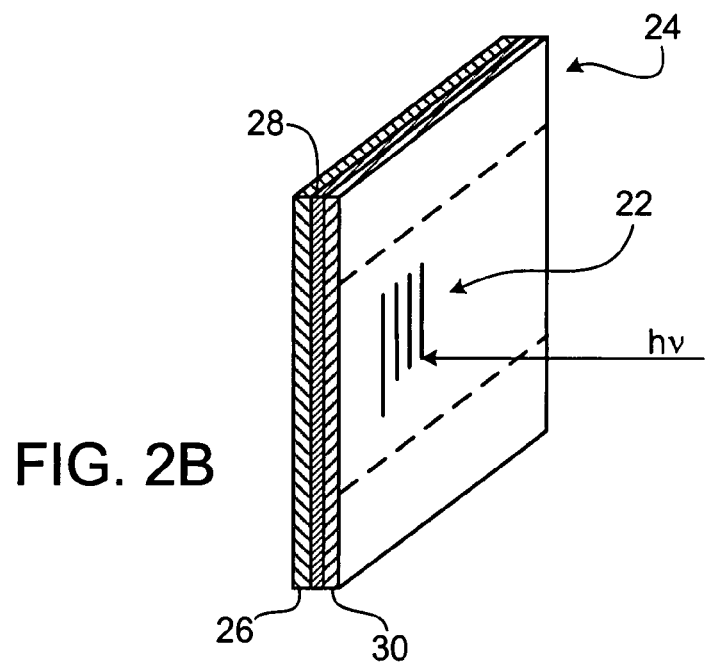
FIG. 2B is a detailed view of FIG. 2A.

The marks can be used to label a variety of end products. For example, referring to FIGS. 2A and 2B, in food packaging, multilayer structure 24 can be addressed by a laser 40 to form mark 22 (as shown, a bar code) as the multilayer structure is delivered flatly from a supply roll 42 to a take-up roll 44. Subsequently, the marked multilayer structure can be joined with another structure (e.g., heat sealed on three sides to another multilayer structure 24) to form packages 20. Packages 20 can then be cut into individual units, filled with the selected food product, and completely sealed. In other embodiments, one or more marks 22 can be formed after packages 20 are filled with their contents.

In some embodiments, the marking of the package does not substantially change the gas transmission properties of the package relative to the unmarked package. For example, the oxygen transmission rate, carbon dioxide transmission rate, or water vapor transmission rate of the marked packages does not substantially change.

In other embodiments, the marking of the package does not change the gas transmission rate of the package (e.g., oxygen, carbon dioxide, or water vapor transmission rate) relative to the unmarked package by more than 1 percent, more than 2 percent, more than 3 percent, more than 4 percent, more than 5 percent, more than 6 percent, more than 7 percent, more than 8 percent, more than 10 percent, more than 15 percent, or more than 25 percent.

Carbon dioxide transmission rates in units of cc/(100 in$^2$·day) can be measured using a MOCON Permatran-C/4/41 carbon dioxide permeability instrument. The testing protocol can use a test gas of 100 percent carbon dioxide at 0 percent humidity and 760 mm Hg. The test temperature is 23° C., and the carrier gas is nitrogen at 0 percent relative humidity.

Oxygen transmission rates in units of cc/(100 in$^2$·day) can be measured using a MOCON Oxtran 2/21 instrument. The testing protocol can use a test gas of 100 percent oxygen at 0 percent humidity and 760 mm Hg. The test temperature is 23° C., and the carrier gas is ninety-eight percent nitrogen and 2 percent hydrogen at 0 percent relative humidity.

Water vapor transmission rates in units of grams/(100 in$^2$·day) can be measured using a MOCON Permatran-W 3/33 instrument. The testing protocol uses water vapor at 100 relative percent humidity. The test temperature is 37.8° C., and the carrier gas is nitrogen at 0 percent relative humidity.

While a number of embodiments have been described, still other embodiments are possible.

Figure 3:
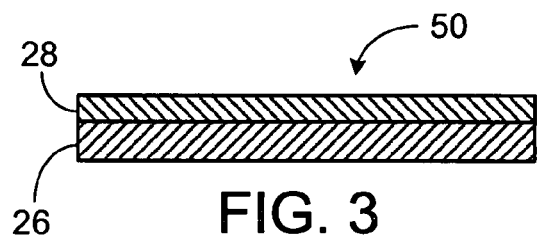
FIG. 3 is a detailed, cross-sectional view of an embodiment of a multilayer structure.

As an example, while electromagnetic radiation is described above as passing through one or more layers to form a mark, in other embodiments, the electromagnetic radiation does not pass through a layer of material before addressing a marking composition. Referring to FIG. 3, a multilayer structure 50 includes substrate 26 and marking composition 28 disposed on the substrate as an exterior or exposed layer, often referred to as surface printing in the art. To form a mark, electromagnetic radiation (hv) is addressed directly to marking composition 28 without passing through a layer of material.

As another example, in some embodiments, a marking composition is substantially free (e.g., less than or equal to approximately 1 wt %) of an absorber. Because thermal energy can activate the color former (e.g., dye) and color developer combination, marking can be accomplished when energy sufficient to cause activation is absorbed by the combination. For example, by varying the amount of the energy source (e.g., laser or heater) power, duration of application, and/or the concentration and/or thickness of the activatable combination, varying degrees of color activation and marking can be accomplished without an absorber.

In some embodiments, a structure including a marking composition can be heated (e.g., by contact with a heated surface, or heated in a tunnel) to lower the activation threshold of the thermally activatable coloring composition. As a result, less energy can be used to form a mark.

In some embodiments, a marking composition is substantially free (e.g., less than or equal to approximately 5 wt %, approximately 3 wt %, approximately 1 wt %) of a color developer. A marking composition can include a mixture having one or more absorbers and one or more dyes. For example, absorbing clays, in the absence of a separate color developer, can facilitate the development of color when energy (e.g., heat) is absorbed by the combination of clay and dye composition. As an example, a marking composition can be combined (e.g., compounded) with one or more polymers (e.g., a thermoplastic resin), and this combination can be addressed with energy (e.g., laser energy) to form a mark. The marking composition can include from approximately 1 wt % to approximately 99 wt % of absorber(s), e.g., from about 1 wt % to about 40 wt %, and from approximately 1 wt % to approximately 99 wt % of dye(s), e.g., from about 1 wt % to about 60 wt %, or about 5 wt % to about 40 wt %. The combination of the marking composition and the polymer(s) can include from approximately 0.1 wt % to approximately 50 wt % of the marking composition, and from approximately 50 wt % to approximately 99 wt % of the polymer(s). The combination of the marking composition and the polymer(s) can include more than one marking composition. The combination of the marking composition(s) and the polymer(s) can be used in applications such as bread bag closures and other applications of marking on rigid and semi-rigid substrates.

In some embodiments, a multilayer structure includes any two or more different marking compositions described herein. For example, a multilayer structure can include a first marking composition with a first activation temperature, a second marking composition with a second activation temperature different from the first activation temperature, and one or more layers of material between the first and second marking compositions. To form a first color (e.g., blue), one of the marking compositions can be selectively activated with an appropriate temperature by applying the appropriate energy, while not activating the other marking composition. To form a second color (e.g., purple or blackish), the other marking composition can be selectively activated with the appropriate energy. The second color can be a combination of the first color and the color developed by the other marking composition. In some embodiments, the first and second marking compositions have different absorbers selected to interact with predetermined wavelengths so that colors can be selectively developed, depending on the incident energy being used. A resultant color or the mark observed can be a combination of separately generated colors. Activatable layers can become transparent, opaque, or a specific color depending on the composition chosen and application.

A mark can be formed without applying electromagnetic radiation, e.g., from a laser. For example, any method of delivering heat to or creating heat on a marking composition can be used to generate a color change. Examples of methods include but are not limited to thermal printing, hot stamp, and hot air jet.

A multilayer structure can include more than three layers, for example, four layers, five layers, six layers, seven layers, or more than eight layers. As an example, a multilayer structure that can be used for packaging food can include an inner layer of paper (for stiffness). A layer of a marking composition can be applied on the exterior surface of the paper, and a polyethylene layer can be applied on the exterior surface of the marking composition. The inner surface of the paper can be laminated to a layer of polyethylene, a layer of aluminum foil (for aseptic packages), and two layers of food grade polyethylene. As a result, the only material to the touch the contents of the package is foodgrade polyethylene.

EXAMPLES

The following examples are illustrative and not intended to be limiting.

Example 1

18.3 pounds of Kromagen Black K170 (TMC Inc.) and 3.4 pounds of deionized water were added into a ten-gallon vessel and mixed slowly at approximately 800 rpm using a Cowles mixer. While stirring, 3.66 pounds of ASP170 (absorber) was added slowly to the vessel to avoid formation of clumps. The mixture thus obtained was then sheared at 1500 rpm for 60 minutes until a dispersion containing particles no larger than 10 microns, as measured by a Hegman gauge (also known as a paint test equipment fineness of grind gauge), was obtained. (A Hegman gauge is a precision gauge manufactured from hardened stainless steel and has two ground channels giving scales of both Hegman (one Hegman equals 12.7 microns) and microns. The Hegman gauge is used by placing the mixture into the top end of the gauge and drawing the mixture down using a scraper blade. The measurement in microns can be made where the particles have been screened out. The associated standards are ISO 1524, BS3900, C6, DIN 53-203, ASTM D1210, ASTM D1316, and ASTM D333.) The wall of the vessel was scraped periodically to remove any solid material stuck to it.

Following the high speed dispersion step, the mixer was turned back to a low speed of approximately 800 rpm, and 14.64 pounds of INXLAM OPAQUE WHITE (INX International Ink Co., Elk Grove Village, Ill.) was added to the vessel. The mixture was stirred for approximately 30 minutes at this speed until homogeneous. The pH of the resulting mixture was then adjusted to 7.5 by adding approximately 4 ounces of a 25% monoethanol amine and water solution to the vessel. The resulting coating had a viscosity of 1420 cP as measured with a Brookfield RVT viscometer using spindle 4 at 20 rpm.

A portion of the coating was then printed onto oriented polypropylene, Bicor SLP™ film from ExxonMobil using a central impression flexographic printing press. The printed film with the coating was laminated to metallized OPP, MET-HB from ExxonMobil, using OPTEMA TC120 extrudate from ExxonMobil.

Figure 4:
FIG. 4 is an image of a lased mark.
Figure 5A:
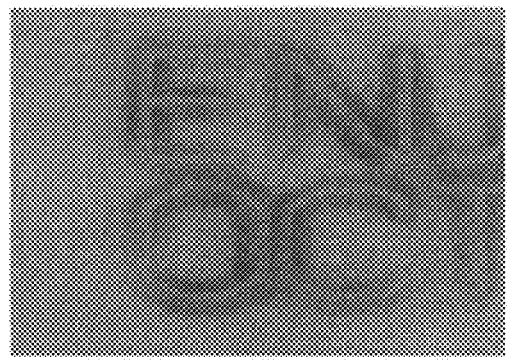
FIGS. 5A-5D are photographs (FIG. 5C being an enlargement of FIG. 5B) of a lased marking composition lased at various noted conditions; the marking composition includes N-benzoylleucomethylene blue and an extender, which has been applied to BOPP and backed by cardstock.
Figure 5B:
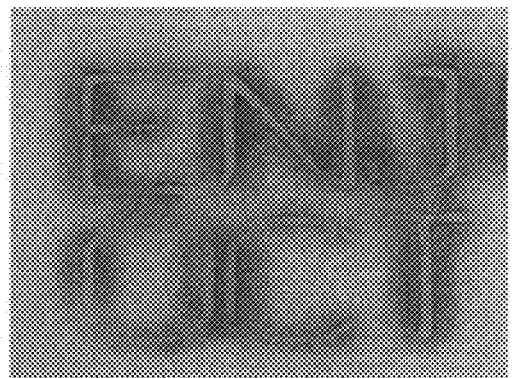
Figure 5C:
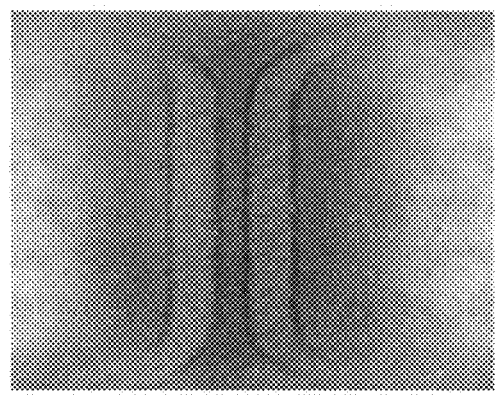
Figure 5D:

After printing and lamination, the laminated film was imaged (marked) using a MARK-EM Smartlase 110 laser at one spot per pixel and a power setting of 25%, with a dwell time of 250 microseconds, resulting in the image shown in FIG. 4. The image showed marked permanence by showing no optical loss over a period at three months.

Example 2

Adding an absorber allows for the generation of a mark at lower power and reduced dwell time or combinations thereof. The absorber can prevent perforation of the substrate film, on which the marking composition is formed, by laser energy. In some embodiments, a mark can be generated using a marking composition that is substantially free of a distinct absorber. By varying the amounts of the energy source (e.g., laser or heater) power, duration of application (dwell time), and/or the concentration and/or thickness of the marking composition, varying degrees of color activation and marking can be accomplished without an absorber.

TABLE 1

| Sample 1 | | | Sample 1a without absorber | | |
|---|---|---|---|---|---|
| Material | % Weight | grams | Material | % Weight | grams |
| Kromagen Black KS170 | 55 | 27.5 | Kromagen Black KS170 | 65 | 27.5 |
| White Flexo Lamial II | 30.00 | 15.00 | White Flexo Lamial II | 35 | 15.00 |
| ASP-170 (absorber) | 15.00 | 7.50 | | | |
| Total | 100.00 | 50.00 | Total | 100.00 | 42.5 |

| Sample 2 | | Sample 2a without absorber | |
|---|---|---|---|
| Material | % Weight | Material | % Weight |
| Kromagen Black K170 | 90 | Kromagen Black K170 | 100 |
| ASP-170 (absorber) | 10 | | |
| Total | 100.00 | Total | |

TABLE 2

| Power/Dwell Time % peak power/ms | Sample 1 (with absorber) spot size - microns | Sample 1a - KS-170 formulation-no absorber spot size in microns | Sample 2 (with absorber) spot size in microns | Sample 2a - K-170 formulation no absorber spot size in microns |
|---|---|---|---|---|
| 20/200 | 130 | 60 | 200 | 100 |
| 25/250 | 220 | | 200 | 150 |
| 35/250 | 250 | 190 | 240 | 150 |
| 45/250 | 320 | 240 | 340 | 180 |
| 50/250 | 360 | 240 | 290 | 220 |

The description that follows is made with reference to the tables below. Draw downs were made of each sample onto 1.25 mil BOPP films. For Sample #1, a solvent based system, a #95 hand proffer was used with one ink layer deposited resulting with a film coat weight of 6.28 g/m². For KS-170 samples, a #95 hand proffer was also used with five ink layers deposited resulting with a coat weight of 5.78 g/m². For Sample 2, a water based system, a #2 wire wound rod (WWR) on the automatic draw down machine with one ink layer having a dry coat weight of 5.11 g/m². For K-170, a #95 hand proffer was used with one ink layer with a dry coat weight of 5.14 g/m².

Samples were then applied onto 2.5"×2.5" pieces of white card stock and a mark was formed by imaging with a Smartlase 110 10 W $CO_2$ laser (available from MARKEM Corporation) using power and dwell settings that are listed on each of the samples below. An Olympus DP 10 microscope with a magnification set at 108 was used. For each power setting, a microphotograph was taken, and a micro ruler (with increments of ten micron per line) was also photographed. Spot size was measured and recorded comparing Sample 1 with the KS-170 and Sample 2 with K-170. Samples were compared with and without the absorber present.

As shown in TABLE 2, in both water and solvent based systems, successful marking was accomplished without an added absorber by varying the power and dwell time of the energy source.

Example 3

In this example, a marking composition was mixed and incorporated with a polymer (e.g., high impact polystyrene resin), and a mark was formed by addressing on the resulting rigid or semi-rigid material with energy (e.g., laser imaging).

Five grams of 17.8% high impact polystyrene dissolved in Xylene (90.9%) was mixed with 0.2 gram benzoyl methylene blue dye (3.63%) 0.3 gram ASP-170 absorber (5.45%) to form a sample mixture. A small amount of the sample was spread out on the bottom of an aluminum weighing pan and allowed to air dry. The sample was semi-rigid and relatively stiff. The sample was marked to form an image using the Smartlase 110 $CO_2$ laser at 100% power and a dwell time of 500 ms with a spot size of 3 spots per pixel.

Example 4

The following heat-sensitive compositions were prepared by combining the components of the formulations noted below, and then magnetically blending until homogeneous. Once homogenous, the compositions were drawn down onto BOPP film using a #2 wire wound rod. The dried films were exposed to the indicated laser radiation at the indicated.

| | |
|---|---|
| N-benzoylleucomethylene blue (TCI America) | 40.0 parts |
| Nacure 2530 (King Industries) | 40.0 parts |
| Krumbar K1717 HMP resin (Lawter) | 20.0 parts |

This initially light white/colorless film was exposed to laser radiation from an 808 nm diode laser. Indicia were produced at 8 W. One spot of indicia was produced for each laser pixel.

| | |
|---|---|
| Indoxyl acetate (Aldrich) | 10.0 parts |
| N-benzoylleucomethylene blue (TCI America) | 10.0 parts |
| ASP-170 Kaolin clay (Engelhard) | 20.0 parts |
| Flexo Laminal II Extender (INX International Ink Co.) | 60.0 parts |

This initially light white/colorless film was exposed to laser radiation from a MARKEM Smartlase 110 $CO_2$ laser. Text indicia was produced at 25% power and 200 μs dwell time. One spot of indicia was produced for each laser pixel.

Example 5

Certain observations regarding compositions that include N-benzoylleucomethylene blue are described in this example.

N-benzoylleucomethylene blue was slowly heated on a stage of a Fisher-Johns melting point apparatus while observing the changes in the initially slightly yellow material. The sample was heated from room temperature to about 230° C. The observations suggested that the material started to melt between about 190° C. and about 200° C., and that the material was completely melted at about 230° C. At this temperature, the color of the material was still slightly yellow. No color change was observed when the material alone was heated.

A 1:1 ratio of N-benzoylleucomethylene blue to Flexo Lamiall II Extender was slowly heated on a stage of a Fisher-Johns melting point apparatus while observing the changes in the initially clear material. The sample was heated from room temperature to about 230° C. It was noted that at a temperature of about 145° C., edges of the sample started turning green; at about 150° C., the sample was a yellow/green; at about 170° C., the sample was a green/blue; at about 205° C., the sample started to turn brown (i.e., burn); and at about 230° C., the sample appeared brown.

A 1:1 ratio of N-benzoylleucomethylene blue to ASP-170 (kaolin clay) was slowly heated on a stage of a Fisher-Johns melting point apparatus while observing the changes in the initially white material. No color change was seen until about 200° C., at which time the sample began to turn light blue. At about 210° C. to about 220° C., the sample appears to melt, followed by a darker blue when the temperature reached about 230° C. to about 240° C.

A 1:3.5 ratio of N-benzoylleucomethylene blue to ASP-170 (kaolin clay) in Flexo Lamiall II Extender was slowly heated on a stage of a Fisher-Johns melting point apparatus while observing the changes in the initially white material (formula below). No color change was seen until about 125° C., at which time the sample began to turn light blue at its edges. By about 140° C., the sample was almost completely blue, and at about 160° C., sample the completely blue.

| COMPONENT IN FORMULATION | Weight Percent | Mass Component Added (grams) |
|---|---|---|
| Flexo Lamiall II Extender | 55.80 | 2.79 |
| N-benzoylleucomethylene blue | 9.80 | 0.49 |
| ASP-170 | 34.40 | 1.72 |
| Total | 100.00 | 5.00 |

These results show that N-benzoylleucomethylene blue alone does not change color in the temperature range from about room temperature to about its melting point, and that a formulation that includes N-benzoylleucomethylene blue and Flexo Lamiall II Extender appears to decompose at about the melting point N-benzoylleucomethylene blue. The results also indicate that including kaolin in a formulation with N-benzoylleucomethylene blue effects the desired blue color change when heated about the melting point of N-benzoylleucomethylene blue. In addition, the results indicate that a formulation that includes N-benzoylleucomethylene blue, kaolin and Flexo Lamiall II Extender also develops the desired color change, but generally at a lower temperature than without the extender.

Example 6

N-benzoylleucomethylene blue was incorporated into formulations that included clear flexo ink (Flexo Lamiall II Extender) and, in some of the examples that follow, kaolin ASP-170. These formulations were drawn down on biaxial oriented polypropylene (BOPP) film, mounted on Krome Kote gloss paper. The dried formulations were marked by lasing with a $CO_2$ laser at various power and dwell settings.

N-benzoylleucomethylene blue (CAS No.: 1249-97-4) was purchased from TCI America. Flexo Lamiall II Extender solvent based extender (Product No.: 1199048-1510, Lot No.: 797624) was purchased from INX International Ink Company. Kaolin ASP-170 (CAS No.: 1332-58-7) was purchased from Engelhard.

To make the coatings, a Control Coater KCC 101, which is produced by RK Print Coat Instruments, was utilized in conjunction with a #2 wire wound drawdown bar.

The components of a particular formulations were mixed in scintillation vials, and then stirred using Puritan 6-inch wooden applicators. The formulations were applied to biaxially oriented polypropylene film (BOPP film) produced by ExxonMobil. The films secured and backed using Krome Kote gloss cardstock, purchased from Braden Printing.

To coat the BOPP film, the following procedure was used:
1. The film was cut to length (approximately 24 inches long) from the roll using scissors;
2. The cut BOPP film was placed on the stage of the coater with the lower energy side, e.g., the plasma or corona treated side, of the film facing away from the stage and then the film was secured with a clip at the top of the stage;
3. A #2 wire wound drawdown bar was placed in the metal holders of the control coater, and the bar was checked for levelness;
4. Approximately one gram of the desired formulation was pipetted onto the film directly below the intersection of the bar and the film;
5. The coater was energized and the speed knob set to forward;

6. After running the coater, the bar removed from the metal holders and cleaned using acetone and a cloth rag; and
7. The film was removed, and then set aside to dry.

The coated film was mounted on the Krome Kote cardstock using the following procedure:
1. Approximately two inches of the uniformly coated film was cut;
2. The cutting was placed with the coating facing down on a 2 in$^2$ piece of Krome Kote cardstock; and
3. The cutting was secured to the Krome Kote on two sides using one-sided transparent tape.

The coated film secured to the card stock was lased with a MARKEM SmartLase® 10 watt $CO_2$ laser using the following procedure:

Lasing coated film:
1. The laser was energized;
2. The mode of the laser was set to manual;
3. Using the P+, P– or T+, T– arrows, the power and dwell, respectively, were adjusted to the desired level;
4. The coated film on the cards stock was placed under the laser and aligned so that the area to be lased was centered in the red outlined box; and
5. The coated film was lased with the preset marking pattern by pressing the "EXE" key on the keypad.

0.16 grams of N-benzoylleucomethylene blue and 1.17 grams of Flexo Lamiall II were combined in a scintillation vial and mixed with a wooden applicator until well mixed. A drawdown of this mixture was made on BOPP film and lased with the $CO_2$ laser. Marks were made at a dwell of 250 μsec and powers of 100%, 75% and 50%. FIGS. 5A-5D show that the formulation exhibited significant "ghosting" about the lased areas, and poorer print quality at lower power (see FIG. 5D).

Figure 6A:
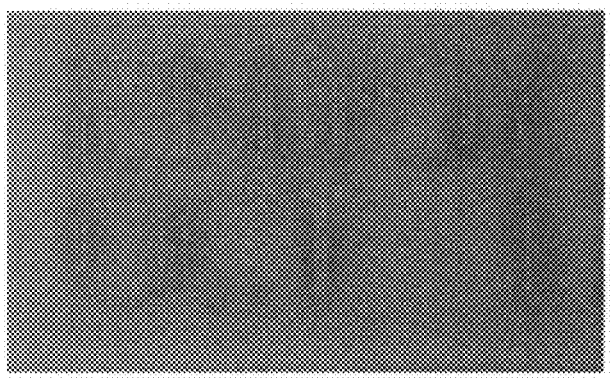
FIG. 6A is a photograph of a lased marking composition lased at noted conditions; the marking composition includes N-benzoylleucomethylene blue and an extender, which has been applied to BOPP and backed by the "dull" side of cardstock; whereas, for comparison.
Figure 6B:
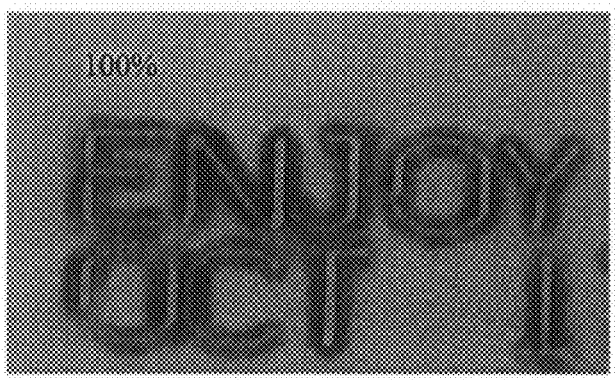
FIGS. 6B-6D are photographs of the same marking composition lased at the noted conditions, which has been applied to the BOPP and backed by the "shiny" side of cardstock.
Figure 6C:
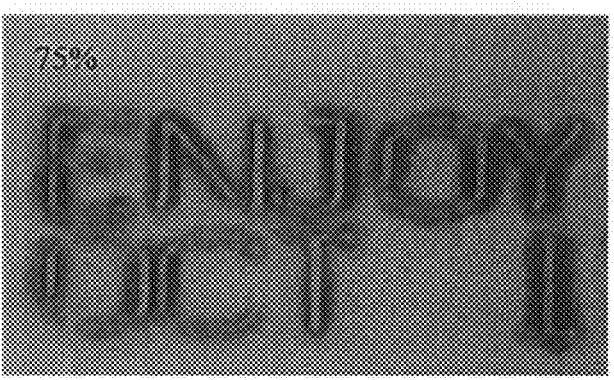
Figure 6D:
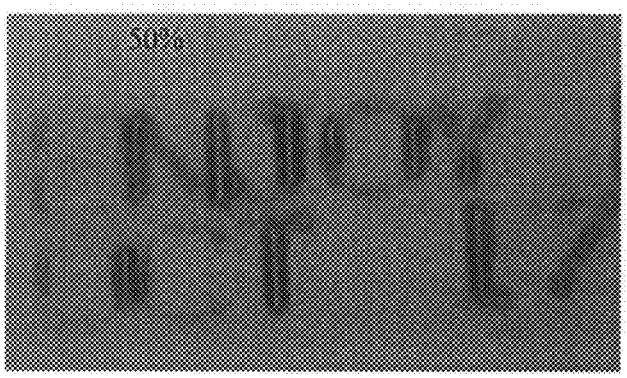

1.020 grams of N-benzoylleucomethylene blue and 4.028 grams of Flexo Lamiall II were combined in a scintillation vial and mixed with a wooden applicator until well mixed. This mixture was drawn down on BOPP film, and sections of the drawdown were mounted on the "shiny" side or the "dull" side of squares of Krome Kote cardstock. These mounted drawdowns were lased using the $CO_2$ laser with a dwell of 250 μsec and powers of 100%, 75%, 50% and 40%. FIGS. 6B, 6C and 6D, which were mounted on the shinny side of the Krome Kote cardstock, show the same effect as those of FIGS. 5A-5D; namely, they all showed significant "ghosting" and lower print quality at lower power. FIG. 6A shows that, apparently, some of the dye sublimes off and adheres to the shiny card stock.

Figure 7:
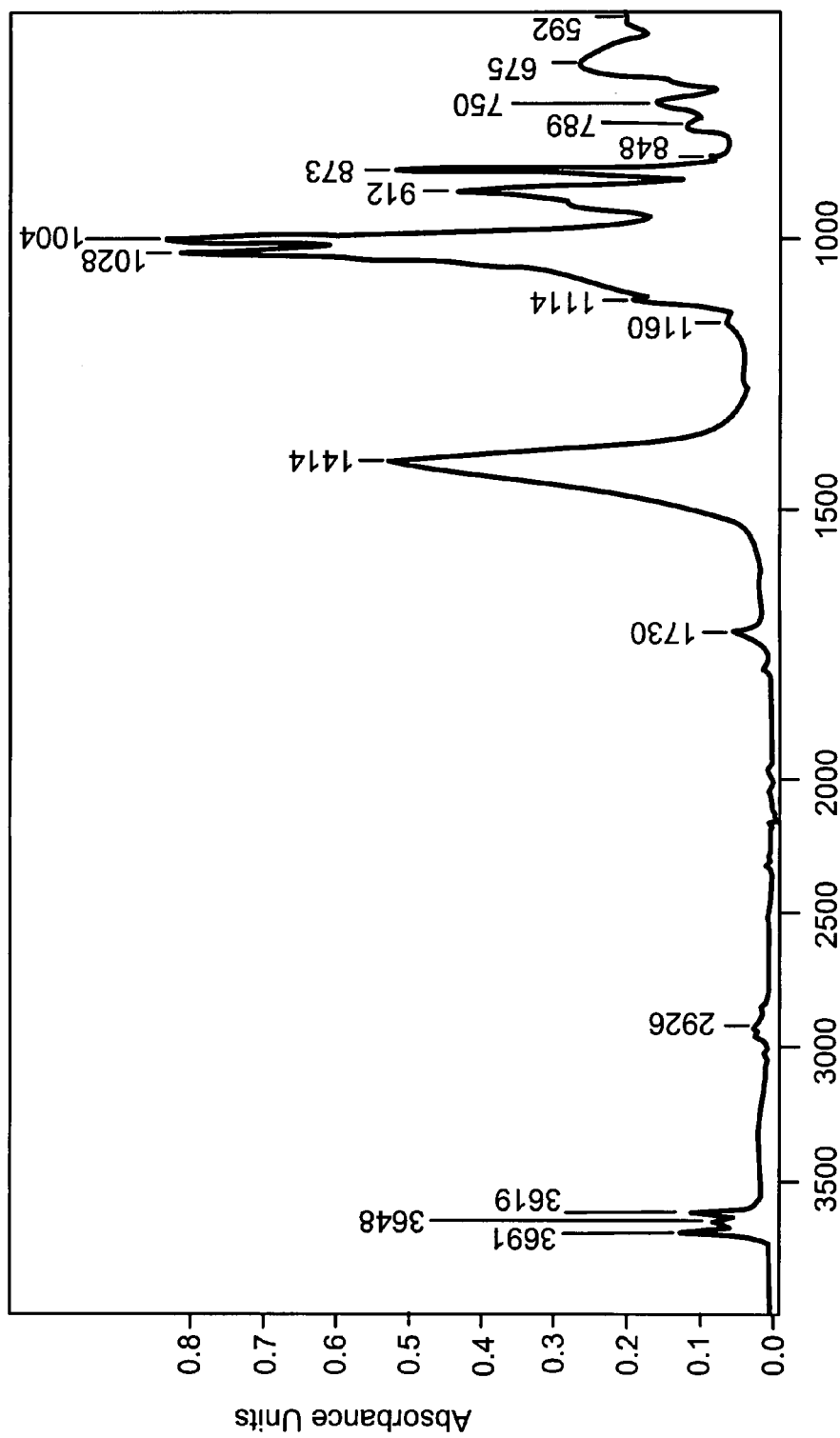
FIG. 7 is an infrared spectrum of the "shiny" side of cardstock.
Figure 8:
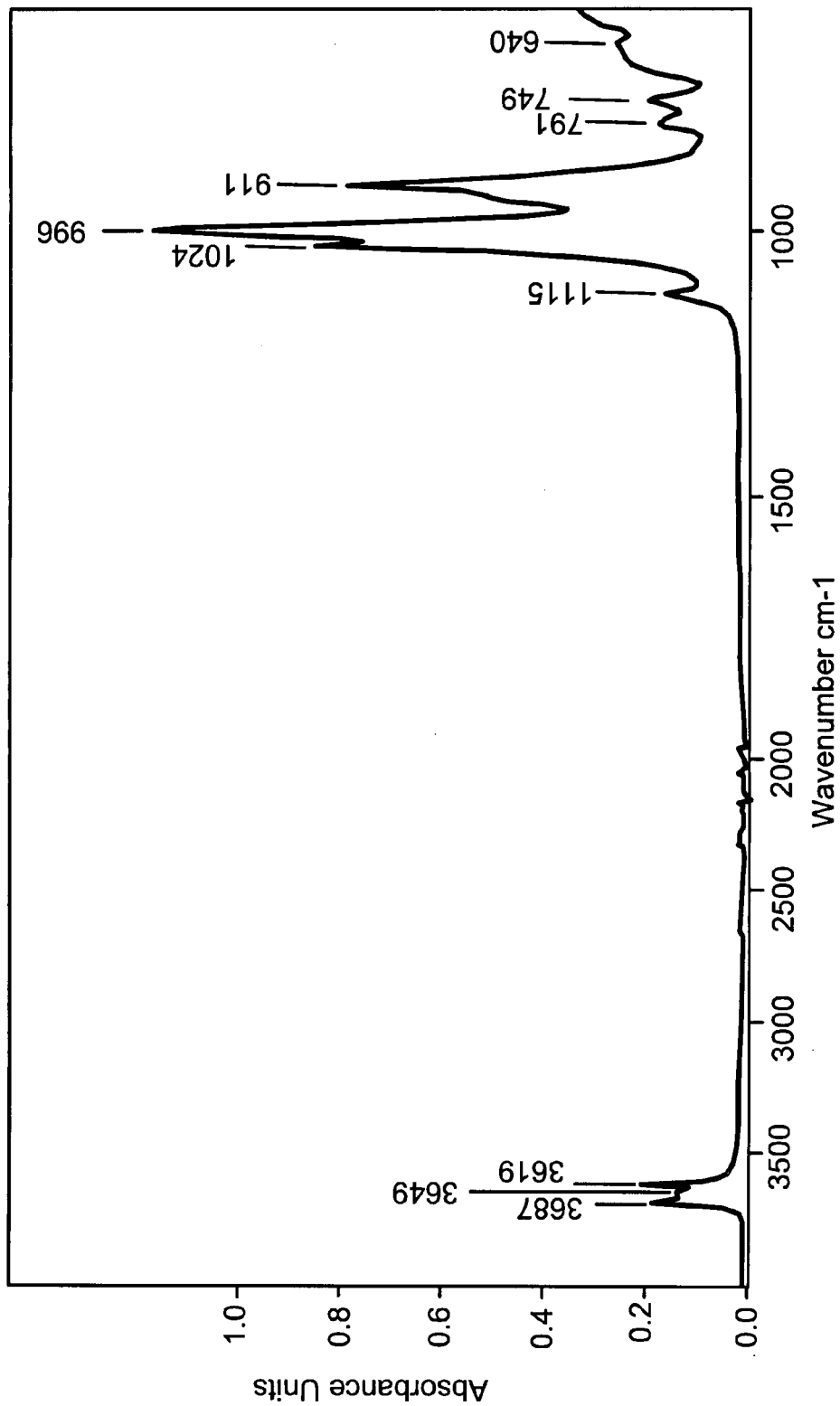
FIG. 8 is an infrared spectrum of APS-170 clay.
Figure 9:
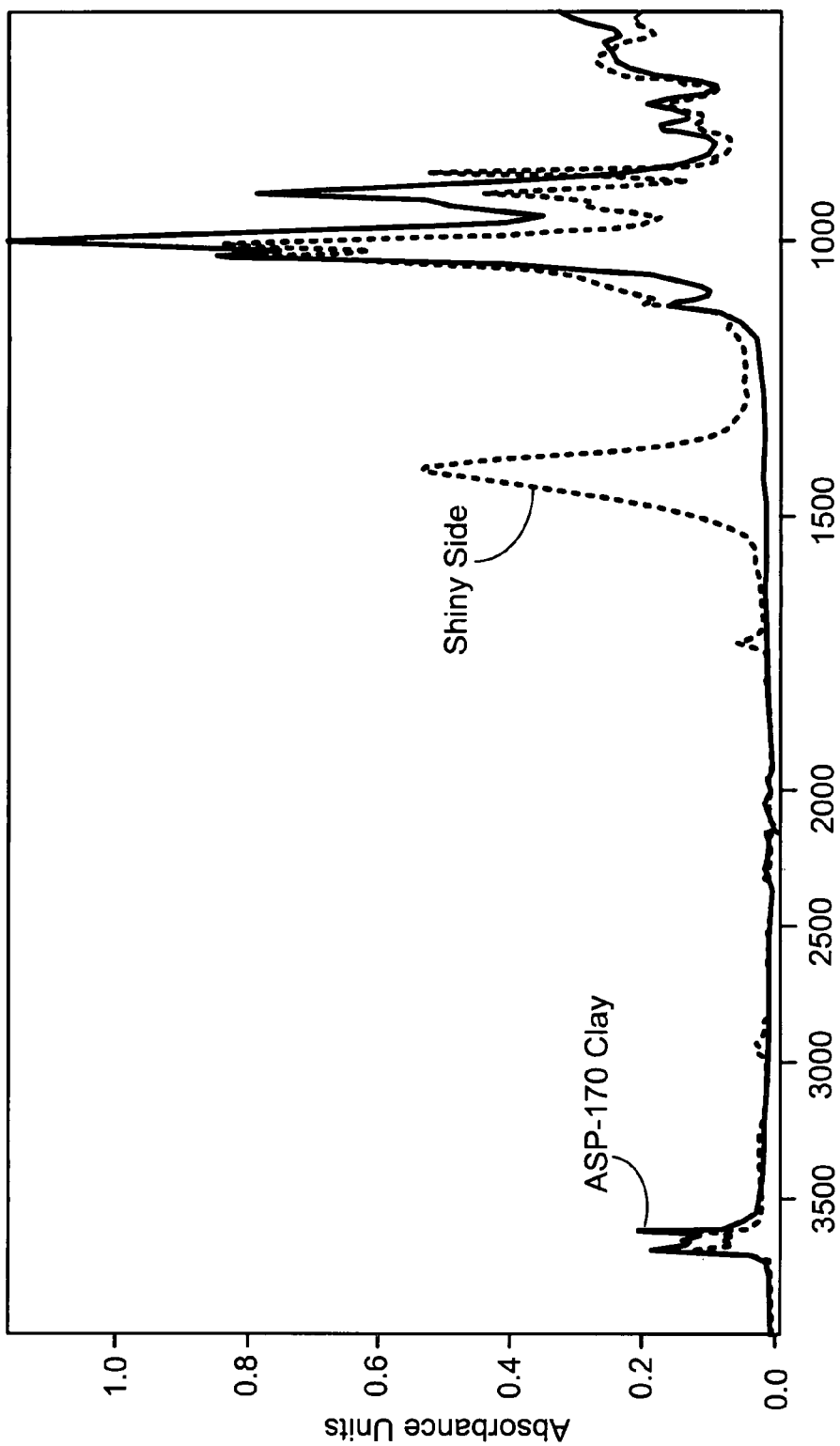
FIG. 9 is an overlay of the spectra of FIGS. 7 and 8.
Figure 10A:
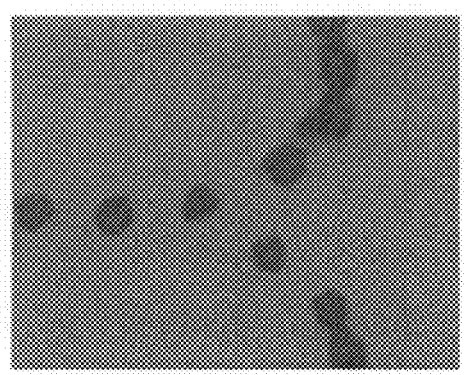
FIGS. 10A-10D are photographs (FIGS. 10B and 10D being enlargements of FIG. 10A and 10C, respectively) of a lased marking composition lased at various noted conditions; the marking composition includes N-benzoylleucomethylene blue, an extender and ASP-170 clay.
Figure 10B:
Figure 10C:
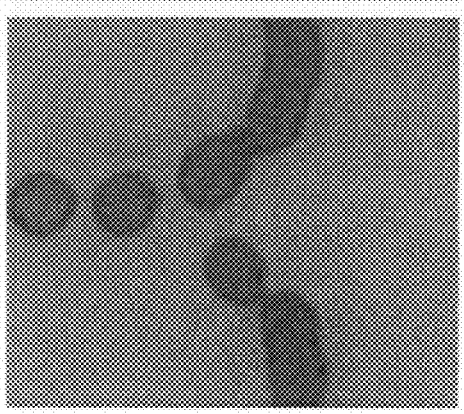
Figure 10D:
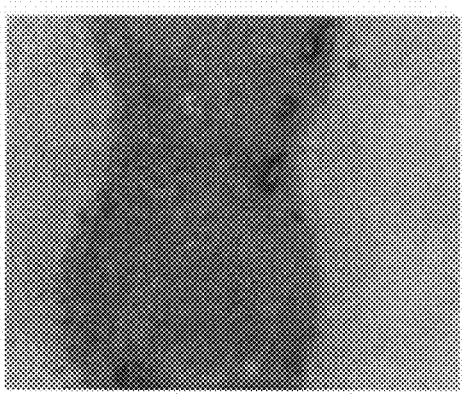

An infrared spectrum of the shiny side of the Krome Kote cardstock was obtained using a Bruker FT-IR and is shown in FIG. 7. For comparison, an IR spectrum of kaolin ASP-170 was also measured (FIG. 8). An overlay of FIGS. 7 and 8 (shown in FIG. 9) shows that the shinny side of the Krome Kote includes an aluminum silicate, likely a clay.

0.527 grams of N-benzoylleucomethylene blue, 2.499 grams of Kaolin ASP-170 and 3.001 grams of Flexo Lamiall II were combined in a glass scintillation vial and thoroughly mixed with a wooden applicator. The mixture was drawn down on BOPP film, and sections of the drawdown were mounted on the dull side of squares of Krome Kote cardstock. These mounted drawdowns were lased using the $CO_2$ laser with a dwell of 250 μsec, 200 μsec and 150 μsec, along with powers of 100%, 75%, 50%, 35%, 30% and 20%. Marks were made on the films at all power and dwell settings. The markings made at a dwell of 200 μsec appeared to be the most legible without damaging the film, as shown in FIGS. 10A-10D.

Example 7

The below noted formulations were prepared, and then the formulations were applied to BOPP film. The BOPP films having the dried below-noted formulations applied thereto were aged under ambient conditions for approximately four months. Using a microscope, image-ability of each aged film was assessed by comparison to a control image, which was imaged the same day it was prepared. None of the films appeared to substantially change after the approximately four months of the test with respect to imageability, which indicates that a variety of formulations are stable over extended period of time.

|  | Mass Component Added (grams) |
|---|---|
| COMPONENT IN FORMULATION[1] |  |
| Hercubond lam opaque white | 7.05 |
| ASP-G90 | 2.2 |
| EL06-07C[2] | 0.63 |
| N-benzoylleucomethylene blue | 0.89 |
| COMPONENT IN FORMULATION[3] |  |
| Hercuflex White | 7.36 |
| ASP-G90 | 2.27 |
| EL06-07C | 0.67 |
| N-benzoylleucomethylene blue | 0.49 |
| COMPONENT IN FORMULATION |  |
| PVB 03-9286 | 7.07 |
| ASP-G90 | 2.06 |
| EL06-07C | 0.62 |
| N-benzoylleucomethylene blue | 0.52 |
| PVB 03-9286 | 6.62 |
| ASP-G90 | 2.01 |
| EL06-07C | 0.57 |
| N-benzoylleucomethylene blue | 1.02 |
| PVB 03-9285 | 7.27 |
| ASP-G90 | 2.18 |
| EL06-07C | 0.54 |
| N-benzoylleucomethylene blue | 0.49 |
| PVB 03-9286 | 7.18 |
| ASP-G90 | 2.18 |
| EL06-07C | 0.62 |
| N-benzoylleucomethylene blue | 0.5 |

[1]Dry coating weight on BOPP was 6.4 g/m$^2$.
[2]EL06-07C is Irganox 1010 (6.9% by weight), Irgafos 168 (6.9%) and n-propanol (86.2%).
[3]Dry coating weight on BOPP was 7.3 g/m$^2$.

Example 8

Flexographic prints were extrusion laminated to evaluate if the heat exposure in the lamination process is sufficient to cause a premature color change in the flexographic prints.

A roll of 0.7 mil MET-HB metallized oriented polypropylene (OPP) film made by ExxonMobil was purchased and served as a bottom layer for the laminate. Optema TC-120 resin, which is available from ExxonMobil served as the laminating resin. Optema TC-120 is an ethylene methyl acrylate (EMA) modified polyethylene resin and was extruded at 550° F. during the trial.

Oriented polypropylene (OPP) film having an activatable dye, which was flexographically printed on one surface, served as an upper layer of the laminate. The inks printed on the OPP and evaluated are directly below.

GC6520 Water-based sample including Kromagen K120 and INX ink.
GC6521 Water-based sample using Kromagen K170 and INX ink.
GC6522 Water-based sample using Kromagen K170 Flexo Ink from TMC.
MS2855 Solvent-based sample using KS170, High viscosity.
MS2855 Solvent-based sample using KS170, "Normal viscosity."
MS2856 Solvent-based sample using KS170.

A setup roll of clear film was used to test coat in order to establish a consistent laminate thickness. After some minor adjustments, the desired thickness of 0.5 mil was established. The clear setup roll was then replaced with our roll of metallized OPP and the coating thickness was reconfirmed.

Each roll of pre-printed product was individually placed in a second unwind position and laminated to the metallized OPP at a line speed of 120 fpm, which occupied a second position. This line speed is considerably lower than the industry standard of 300-1000 fpm, but was used as a worst-case rate to maximize the time between hot extrudate contacting the prints and contact with the chiller roll. The edges were trimmed and product was re-wound on 6" cores.

All six rolls of pre-prints were laminated with no visible color change during or after the lamination. The collected test films were imaged with a Smartlase® 110. Slightly more energy, e.g., 5% more laser power and/or 25 to 50 μsec more dwell was generally required to create images on the laminated material. Generally, all of the laminates, with the exception of GC6520 had good imageability. The poor imageability GC6520 was believed due to an excessively thin ink film thickness.

Example 9

BOPP film having NIR absorbing dyes on one surface were laminated to evaluate color change during lamination and imageability. Bi-axially oriented polypropylene (BOPP) film having an activatable dye, which was flexographically printed on one surface, served as an upper layer of the laminate. The inks printed on the BOPP and evaluated are directly below.

| Components | % |
|---|---|
| MS29-18B | |
| KS120 Conc | 40.00 |
| Lam White PVB/NC Ink | 59.75 |
| Photo Dye KF 1151 PINA | 0.125 |
| Photo Dye KF 1152 PINA | 0.125 |
| | 100.000 |
| Viscosity = | 260 cP |
| Run Viscosity | 35s Zahn 2 |
| MS29-18A | |
| KS120 Conc | 40.00 |
| Hercubond White LAM Ink | 59.75 |
| Photo Dye KF 1151 PINA | 0.125 |
| Photo Dye KF 1152 PINA | 0.125 |
| | 100.00 |
| Viscosity = | 110 cP |
| Run Viscosity | 35s Zahn 2 |

A 0.5 mil curtain of extrudate, which was Optema EMA, was used to bond the metallized film to each printed BOPP film. A soft silicone roll was used. Chill roll temperature was approximately 120° F. Lamination was performed at a line speed of about 77 feet/minute.

Each roll printed roll appeared to be stable during the lamination process, as none of the samples appeared to darken during lamination. The energy required to create marks on the laminated versus non-laminated samples appears to have doubled. Fluence values ranged from about 3.2 J/cm$^2$ (darkest image) to about 6.5 J/cm$^2$ (lightest image).

Example 10

Flexographic prints were extrusion laminated to evaluate if the heat exposure in the lamination process is sufficient to cause a premature color change in the flexographic prints.

A roll of 0.7 mil MET-HB metallized oriented polypropylene (OPP) film made by ExxonMobil was purchased and served as a bottom layer for the laminate. Optema TC-120 resin served as the laminating resin. Optema TC-120 is an ethylene methyl acrylate (EMA) modified polyethylene resin, which is available from ExxonMobil.

Oriented polypropylene (OPP) film having an activatable dye, which was flexographically printed on one surface, served as an upper layer of the laminate. The inks printed on the OPP and evaluated are directly below.

| Components | % |
|---|---|
| RUN #1 GC6670 | |
| KS120 Conc. | 35.0 |
| Hercubond White Ink | 55.0 |
| ASP170 Kaolin clay | 10.0 |
| | 100.00 |
| RUN #2 GC6672 | |
| KS120 Conc. | 45.0 |
| Lam White PVB/NC Ink | 45.0 |
| ASP170 Kaolin clay | 10.0 |
| | 100.0 |
| RUN #3 MS2912 | |
| BLMB | 8.0 |
| Hercubond White Ink | 61.3 |
| G90 Kaolin clay | 24.0 |
| IRG 1010 | 0.55 |
| IRG 168 | 0.55 |
| n-butyl acetate | 5.6 |
| | 100.0 |
| RUN #5 MS2913 | |
| Ammonium heptamolybdate | 10.5 |
| Hercubond White Ink | 72.4 |
| ASP170 Kaolin clay | 15.0 |
| Tego 710 | 2.1 |
| | 100.0 |

A setup roll of clear film was used to test coat in order to establish a consistent laminate thickness. After some minor adjustments, the desired thickness of 0.5 mil was established. The clear setup roll was then replaced with our roll of metallized OPP and the coating thickness was reconfirmed.

Each roll of pre-printed product was individually placed in a second unwind position and laminated to the metallized OPP at a line speed of from about 200-400 fpm, which occupied a second position. This line speed is considerably lower than the industry standard of 300-1000 fpm, but was used as a worst-case rate to maximize the time between hot extrudate contacting the prints and contact with the chiller roll. The edges were trimmed and product was re-wound on 6" cores.

All five rolls of pre-prints were laminated with no visible color change during or after the lamination, and lamination bond strengths appeared to be sufficient. Generally, all of the laminates could be imaged.

Other Embodiments

Other embodiments are within the claims.

What is claimed is:

1. A marking composition, consisting of:
   an absorber capable of producing thermal energy upon interacting with electromagnetic radiation; and
   a thermally activatable coloring composition consisting of a leuco dye, a color developer, and one or more organic solvents, wherein the color developer is an acid or a material capable of generating an acid moiety, the leuco dye and the color developer are dispersed as solid particles in the one or more organic solvents, and the thermally activatable coloring composition is stable under common environmental conditions;
   wherein the marking composition is capable of interacting with the electromagnetic radiation delivered from a laser and having a wavelength of from about 200 nm to about 15,000 nm, to form a mark.

2. The marking composition of claim 1, wherein the absorber has a maximum absorption wavelength from about 200 nm to about 15,000 nm.

3. The marking composition of claim 1, wherein the absorber comprises a hydrous aluminosilicate.

4. The marking composition of claim 1, wherein the absorber comprises a particle having an average dimension from about 0.1 micron to about 40 microns.

5. A method, comprising:
   directing electromagnetic radiation to a structure, the structure comprising a substrate, a first layer, and a marking composition of claim 1 between the substrate and the first layer,
   wherein at least a portion of the electromagnetic radiation is transmitted through the first layer, and the structure is marked.

6. The method of claim 5, wherein the marking composition prior to directing electromagnetic radiation to the structure exhibits a first color, and wherein after directing electromagnetic radiation to the structure, the mark exhibits a second color different from the first color.

7. The method of claim 6, wherein the first color is white or clear, and wherein the second color is blue.

8. The method of claim 5, wherein the absorber comprises a hydrous aluminosilicate.

9. The method of claim 5, wherein the mark comprises a number, a letter, a word, a symbol, or a bar code.

10. A method, comprising:
    directing electromagnetic radiation to a marking composition on a substrate to form a mark, the marking composition of claim 1.

11. The method of claim 10, wherein the marking composition comprises from about 0.125 wt % to about 40 wt % of the absorber.

12. The method of claim 10, wherein the absorber comprises a hydrous aluminosilicate.

13. The method of claim 10, wherein the electromagnetic radiation has a wavelength of from approximately 400 nanometers to approximately 1,200 nanometers or approximately 9,300 nanometers to approximately 10,600 nanometers.

14. The method of claim 10, wherein the mark comprises a number, a letter, a word, a symbol, or a bar code.

15. The method of claim 10, further comprising enclosing a consumer product with the substrate and the marking composition.

16. An article, comprising:
    a substrate;
    a first layer; and
    a marking composition of claim 1 between the substrate and the first layer.

17. The article of claim 16, wherein the marking composition prior to interacting with electromagnetic radiation exhibits a first color, and wherein after interacting with the radiation, the mark exhibits a second color different from the first color.

18. The article of claim 16, wherein the absorber comprises a hydrous aluminosilicate.

19. An article, comprising:
    a substrate; and
    a marking composition of claim 1 on the substrate.

20. The article of claim 19, wherein the dye is unencapsulated.

21. A composition comprising:
    a masked colorant in a protected leuco form;
    an absorber; and
    a binder.

22. The composition of claim 21, wherein the composition undergoes color change when exposed to radiation of wavelength greater than about 400 nm.

23. The composition of claim 21, wherein the masked colorant is an indigo precursor in a protected leuco form.

24. The composition of claim 21, wherein the composition exhibits a first color at room temperature and nominal atmospheric pressure, and wherein when the composition is exposed to a temperature above room temperature and/or is exposed to electromagnetic radiation, the composition changes to a second color different from the first color in areas exposed to the heat and/or electromagnetic radiation.

25. A method of unmasking a masked colorant in a composition comprising the masked colorant in a protected leuco form, an absorber and a binder, the method comprising exposing the composition to radiation of a wavelength of greater than about 400 nm, thereby unmasking the masked colorant.

26. The method of claim 25, wherein the radiation has a wavelength of greater than about 800 nm, a power of less than about 10 Watts, and an energy less than about 7 J/cm$^2$.

27. The method of claim 25, wherein the masked colorant is a leuco methylene blue in a protected leuco form.

28. The method of claim 25, wherein the unmasked colorant produces an indicia on a substrate.

29. A method of marking a substrate, the method comprising exposing a substrate coated with a composition of claim 21 to radiation of a wavelength of greater than about 400 nm, thereby unmasking the masked colorant to produce a mark on the coated substrate.

30. The method of claim 29, wherein the radiation has a wavelength of greater than about 800 nm, a power of less than about 10 Watts, and an energy less than about 7 J/cm$^2$.

31. The method of claim 29, wherein the masked colorant is an indigo precursor in protected leuco form.

32. The method of claim 29, wherein the mark is produced by at least one change in color that occurs when the colorant is unmasked.

33. An article comprising a multilayered substrate comprising a first layer and a second layer, and a composition of claim 21 between the first layer and second layer.

34. The article of claim 33, wherein the masked colorant is an indigo precursor in a protected leuco form.

35. An article comprising:
a substrate; and
an activatable marking composition of claim 21 disposed on and/or in the substrate,
wherein the marking composition exhibits a first color at room temperature and nominal atmospheric pressure, and wherein when the marking composition is contacted by heat and/or radiation, the marking composition exhibits a second color different from the first color in areas of contact.

36. The article of claim 35, wherein the masked colorant comprises N-benzoylleucomethylene blue.

37. The article of claim 35, wherein the absorber comprises an acidic clay.

38. The article of claim 35, wherein the heat and/or radiation is delivered from a laser.

39. A package comprising:
a substrate; and
an activatable marking composition of claim 21, wherein the marking composition is disposed on and/or in the substrate or a portion of the substrate, wherein the marking composition exhibits a first color at room temperature and nominal atmospheric pressure, wherein when the marking composition is contacted by heat and/or radiation, the marking composition exhibits a second color different from the first color in areas of contact, and wherein prior to the contacting of the marking composition by heat and/or radiation, the package has a first oxygen transmission rate, and after contacting the marking composition with the heat and/or radiation, the package has a second oxygen transmission rate that is not more than about 25 percent higher than the first oxygen transmission rate.

40. The package of claim 39, wherein the second oxygen transmission rate is not more than about 10 percent higher than the first oxygen transmission rate.

41. The package of claim 40, wherein the second oxygen transmission rate is not more than about 5 percent higher than the first oxygen transmission rate.

42. The package of claim 41, wherein the second oxygen transmission rate is not more than about 2.5 percent higher than the first oxygen transmission rate.

43. The package of claim 42, wherein the second oxygen transmission rate is not more than about 1.0 percent higher than the first oxygen transmission rate.

44. The package of claim 39, wherein the second oxygen transmission rate is substantially the same as the first oxygen transmission rate.

45. The package of claim 39, wherein the package also has a first carbon dioxide transmission rate, and wherein after contacting the marking composition with the heat and/or radiation, the package has a second carbon dioxide transmission rate that is not more than 25 percent higher than the first carbon dioxide transmission rate.

46. The package of claim 39, wherein the package also has a first water vapor transmission rate, and wherein after contacting the marking composition with the heat and/or radiation, the package has a second water transmission rate that is not more than 25 percent higher than the first water transmission rate.

47. The package of claim 39, wherein the masked colorant comprises N-benzoylleucomethylene blue.

48. The package of claim 39, wherein the heat and/or radiation is delivered from a laser.

49. A method, comprising:
directing electromagnetic radiation to a structure, the structure comprising a substrate, a first layer, and a marking composition of claim 21 between the substrate and the first layer, wherein at least a portion of the electromagnetic radiation is transmitted through the first layer, and the structure is marked.

\* \* \* \* \*

UNITED STATES PATENT AND TRADEMARK OFFICE
CERTIFICATE OF CORRECTION

| | | |
|---|---|---|
| PATENT NO. | : 8,500,895 B2 | Page 1 of 1 |
| APPLICATION NO. | : 11/789263 | |
| DATED | : August 6, 2013 | |
| INVENTOR(S) | : David H. Blank et al. | |

It is certified that error appears in the above-identified patent and that said Letters Patent is hereby corrected as shown below:

On the Title Page, Left Column, under Item (73) Assignee, delete "Marken-Imaje" and insert -- Markem-Imaje -- therefor.

Signed and Sealed this
First Day of October, 2013

Teresa Stanek Rea
*Deputy Director of the United States Patent and Trademark Office*